(12) United States Patent
Yoshida et al.

(10) Patent No.: US 7,646,684 B2
(45) Date of Patent: Jan. 12, 2010

(54) RECORDING MANAGEMENT INFORMATION AND RELIABILITY INFORMATION IN A RECORDING MEDIUM FOR MANAGEMENT OF THE RECORDING MEDIUM

(75) Inventors: Masayoshi Yoshida, Tokorozawa (JP); Takeshi Koda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 223 days.

(21) Appl. No.: 11/790,745

(22) Filed: Apr. 27, 2007

(65) Prior Publication Data

US 2007/0263511 A1 Nov. 15, 2007

Related U.S. Application Data

(62) Division of application No. 10/588,917, filed as application No. PCT/JP2005/001755 on Feb. 7, 2005.

(30) Foreign Application Priority Data

Feb. 12, 2004 (JP) ............................. 2004-035063

(51) Int. Cl.
*G11B 7/00* (2006.01)
(52) U.S. Cl. .................... 369/47.14; 369/53.17; 714/8; 714/701
(58) Field of Classification Search .............. 369/59.25, 369/47.13, 47.14, 53.17, 53.24; 714/5, 8
See application file for complete search history.

(56) References Cited

U.S. PATENT DOCUMENTS 6,633,724 B1    10/2003   Hasegawa et al.
6,956,798 B2 *  10/2005   Mitsuda et al. .......... 369/47.13
7,031,239 B2 *   4/2006   Takahashi et al. ........ 369/47.14
7,266,064 B2 *   9/2007   Hwang et al. ............ 369/53.15
2003/0193859 A1 10/2003   Mitsuda et al.
2004/0174793 A1* 9/2004   Park et al. ................ 369/59.25
2005/0013591 A1  1/2005   Yoshida et al.

FOREIGN PATENT DOCUMENTS

EP    1 172 817 A2    1/2002
JP    07-044431       2/1995

(Continued)

OTHER PUBLICATIONS

Standard ECMA-167, 3rd Edition, Volume and File Structure for Write-Once and Rewritable Media Using Non-Sequential Recording for Information Interchange, Jun. 1, 1997, ECMA, EP002343823, p. 4.14-p. 4.15.

*Primary Examiner*—Peter Vincent Agustin
*Assistant Examiner*—Mark Fischer
(74) *Attorney, Agent, or Firm*—Young & Thompson

(57) ABSTRACT

There are included a plurality of record information recording areas (OPC areas PCA0, user data areas 109-0 or spare areas SA) for recording record information; a management information recording area (management area MA) for recording a plurality of management information for managing the respective ones of the plurality of record information recording areas; and a reliability information recording area (management area MA) for recording a plurality of reliability information (reliability flag group 150) that indicate, for each of the plurality of management information (120, 130 or 140), reliability as to whether the plurality of management information are correctly updated.

4 Claims, 10 Drawing Sheets

FOREIGN PATENT DOCUMENTS

| | | |
|---|---|---|
| JP | 09-167447 | 6/1997 |
| JP | 10-143406 | 5/1998 |
| JP | 11-250583 | 9/1999 |
| JP | 2000-123494 | 4/2000 |
| JP | 2001-184652 | 7/2001 |
| JP | 2001-266547 | 9/2001 |
| JP | 2003-346429 | 12/2003 |
| WO | 03/105149 | 12/2003 |

* cited by examiner

FIG. 4

| Sector Numbers of Head and Tail in Each Block in L0 Layer | L0 Layer Space Bitmap Info. (recorded 1, unrecorded 0) | L0 Layer SBM | L1 Layer SBM | DFL | OPC -P |
|---|---|---|---|---|---|
| 20000 ~ 2FFFF | 0 | | | | |
| 30000 ~ 3FFFF | 0 | | | | |
| 40000 ~ 4FFFF | 0 | | | | |
| 50000 ~ 5FFFF | 0 | | | | |
| 60000 ~ 6FFFF | 1 | | | | |
| 70000 ~ 7FFFF | 1 | | | | |
| 80000 ~ 8FFFF | 1 | | | | |
| 90000 ~ 9FFFF | 1 | | | | |
| A0000 ~ AFFFF | 0 | | | | |
| B0000 ~ BFFFF | 0 | | | | |
| C0000 ~ CFFFF | 0 | | | | |
| D0000 ~ DFFFF | 0 | | | | |
| E0000 ~ EFFFF | 0 | | | | |
| F0000 ~ FFFFF | 1 | | | | |
| 100000 ~ 10FFFF | x0 | 1 | 0 | 0 | 0 |
| ⋮ | ⋮ | | | | |
| 4D0000 ~ 4DFFFF | 1 | | | | |
| 4E0000 ~ 4EFFFF | 0 | | | | |
| 4F0000 ~ 4FFFFF | 0 | | | | |
| 500000 ~ 50FFFF | 0 | | | | |
| 510000 ~ 51FFFF | 0 | | | | |

120: (L0 Layer Space Bitmap column)
121
150: Reliability Flag Group (150-S0, 150-S1, 150-D, 150-P)

FIG. 6

| Sector Numbers of Head and Tail in Each Block in L0 Layer | L0 Layer Space Bitmap Info. (recorded 1, unrecorded 0) | Reliability Flag (Updated 0, Not updated 1) |
|---|---|---|
| 20000 ~ 2FFFF | 1 | |
| 30000 ~ 3FFFF | 1 | |
| 40000 ~ 4FFFF | 1 | |
| 50000 ~ 5FFFF | 1 | |
| 60000 ~ 6FFFF | 1 | |
| 70000 ~ 7FFFF | 1 | |
| 80000 ~ 8FFFF | 1 | |
| 90000 ~ 9FFFF | 1 | |
| A0000 ~ AFFFF | 0 | |
| B0000 ~ BFFFF | 0 | |
| C0000 ~ CFFFF | 0 | |
| D0000 ~ DFFFF | 0 | |
| E0000 ~ EFFFF | 0 | |
| F0000 ~ FFFFF | 1 | |
| 100000 ~ 10FFFF | x0 | 1 |
| ⋮ | ⋮ | |
| 4D0000 ~ 4DFFFF | 1 | |
| 4E0000 ~ 4EFFFF | 1 | |
| 4F0000 ~ 4FFFFF | 1 | |
| 500000 ~ 50FFFF | 1 | |
| 510000 ~ 51FFFF | 1 | |

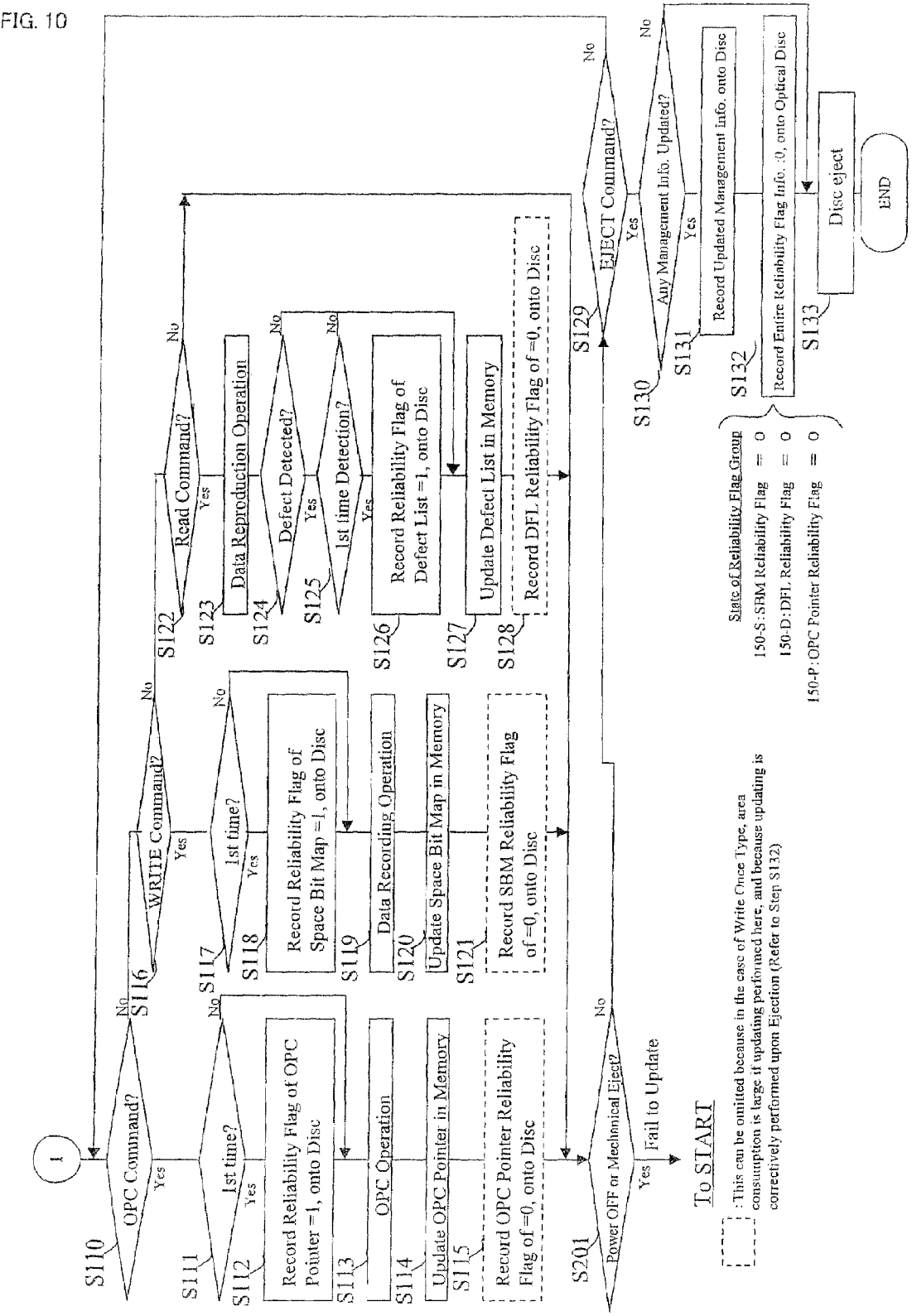

RECORDING MANAGEMENT INFORMATION AND RELIABILITY INFORMATION IN A RECORDING MEDIUM FOR MANAGEMENT OF THE RECORDING MEDIUM

TECHNICAL FIELD

The present invention relates to an information recording medium, such as an optical disc and a hard disk, and an apparatus for and a method of recording data onto such an information recording medium.

BACKGROUND ART

There is a known technique in which management which indicates the recording condition of data in a recording area, i.e., whether or not the data is already recorded, is recorded onto a recording medium, such as an optical disc.

Moreover, there is a known technique in which even if the above-described management information is not recorded onto the recording medium because of the cut-off of a power supply or the like, for example, it is detected by reliability information whether or not the management information is updated, to thereby prevent the inconsistency between the management information and the actual recording condition, and improve the reliability (e.g. patent document 1).

Patent document 1: Japanese Patent Application Laid Open NO. 07-44431

DISCLOSURE OF INVENTION

Subject to be Solved by the Invention

However, according to the above-described techniques, the reliability information does not correspond to each of a plurality of management information, and indicates only one reliability of the entire management information. Thus, for example, if the management information is not recorded onto the recording medium because of the cut-off of the power supply or the like, i.e., if the management information is not updated on the information recording medium, even if it is judged by the reliability information that there is little reliability, it is hardly possible to specify which type of management information out of the plurality of management information does not have reliability. Thus, it is necessary to verify or scan all the management information to show whether or not it is correctly updated to the newest information. Therefore, even the management information which is reliable needs to be verified or scanned, and specifically, there arises a need for verification or scanning of the entire recording area, which takes a long time.

It is therefore an object of the present invention to provide an information recording medium which can greatly reduce a time length for correctly updating various management information to the newest information, even if it is judged that there is little reliability in the various management information recorded on the information recording medium, for example, as well as an information recording apparatus and an information recording method.

Means for Solving the Subject

In order to solve the above object of the present invention, the information recording medium is provided with: a plurality of record information recording areas (an OPC area, a user data area, a spare area, or the like) for recording therein record information; a management information recording area (a management area or the like) for recording therein a plurality of management information, each of which manages respective one of the plurality of record information recording areas; and a reliability information recording area (a management area or the like) for recording therein a plurality of reliability information (a reliability flag group or the like), each of which indicates reliability of whether or not respective one of the plurality of management information (space bitmap information or the like) is correctly updated.

In order to solve the above object of the present invention, the information recording apparatus is an information recording apparatus provided with: a recording device capable of recording the record information onto the information recording medium; a reading device for reading the reliability information from the reliability information recording area; a determining device for determining the management information corresponding to the reliability information read by the reading device; and a controlling device for controlling the recording device to record the record information on the basis of the determined management information.

In order to solve the above object of the present invention, the information recording apparatus is an information recording apparatus for recording record information onto an information recording medium provided with: a plurality of record information recording areas for recording therein the record information; a management information recording area for recording therein a plurality of management information, each of which manages respective one of the plurality of record information recording areas; and an inconsistency flag recording area for recording therein an inconsistency flag indicating whether or not each of the plurality of management information is correctly updated, the information recording apparatus provided with: a record information recording device for recording the record information; a management information recording device for recording the management information; and an inconsistency flag recording device for recording the inconsistency flag, the inconsistency flag recording device recording one symbol information indicating an inconsistency condition as the inconsistency flag before starting the recording by the management information recording device.

In order to solve the above object of the present invention, the information recording method is an information recording method in an information recording apparatus provided with a recording device capable of recording the record information onto the information recording medium, the information recording method provided with: a reading process of reading the reliability information from the reliability information recording area; a determining process of determining the management information corresponding to the reliability information read by the reading process; and a controlling process of controlling the recording device to record the record information on the basis of the determined management information.

In order to solve the above object of the present invention, the information recording method is an information recording method in an information recording apparatus for recording record information onto an information recording medium provided with: a plurality of record information recording areas for recording therein the record information; a management information recording area for recording therein a plurality of management information, each of which manages respective one of the plurality of record information recording areas; and an inconsistency flag recording area for recording therein an inconsistency flag indicating whether or not each of the plurality of management information is correctly updated, the information recording method provided with: a record information recording process of recording the record information; a management information recording process of recording the management information; and an inconsistency flag recording process of recording the inconsistency flag, the inconsistency flag recording process recording one symbol information indicating an inconsistency condition as the inconsistency flag before starting the recording by the management information recording device.

In order to solve the above object of the present invention, the computer program is a computer program of instructions for tangibly embodying a program of instructions executable by a computer provided in the information recording apparatus, to make the computer function as at least one portion of the reading device, the determining device, the controlling device, and the recording device.

These effects and other advantages of the present invention will be more apparent from the following embodiments.

BRIEF DESCRIPTION OF DRAWINGS

FIG. 4 is a conceptual table showing the physical sector number in the recording area, space bitmap information, and a reliability flag group which is one specific example of reliability information corresponding to various management information, in the optical disc in the embodiment of the information recording medium of the present invention.

FIG. 6 is a conceptual table showing the physical sector number in the recording area, space bitmap information, and a reliability flag group which is one specific example of reliability information corresponding to various management information, in the optical disc in the comparison example.

FIG. 10 is a flowchart showing a recording operation if a power supply is cut off on the information recording/reproducing apparatus in the embodiment of the information recording apparatus of the present invention.

DESCRIPTION OF REFERENCE CODES

Figure 1:
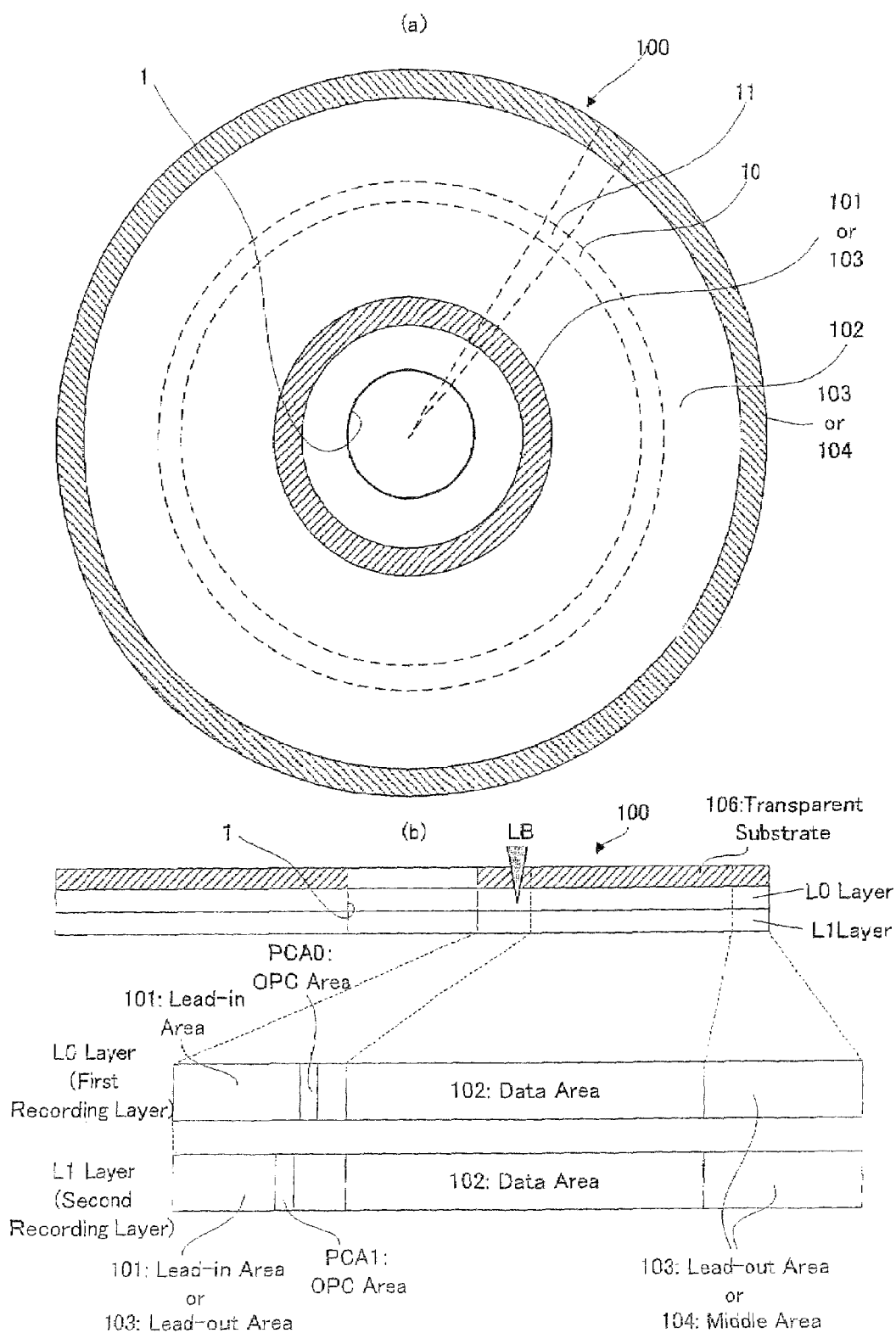
FIG. 1 are a substantial plan view showing a basic structure of an optical disc having a plurality of recording areas in an embodiment of an information recording medium of the present invention (FIG. 1(a)), and a schematic cross sectional view of the optical disc and a corresponding conceptual diagram showing a recording area structure in the radial direction (FIG. 1(b)).

1 . . . center hole, 10 . . . track, 11 . . . sector, 100 . . . optical disc, 101 (101-0 and 101-1) . . . lead-in area, 102 (102-0 and 102-1) . . . data area, 103 (103-0 and 103-1) . . . lead-out area, 104 . . . middle area, 109-0 . . . user data area, 120 . . . space bitmap information, 121 . . . recorded flag, 150 . . . reliability flag group, 150-S . . . reliability flag corresponding to space bitmap information, 150-S0 . . . reliability flag corresponding to space bitmap information in L0 layer, 150-S1 . . . reliability flag corresponding to space bitmap information in L1 layer, 150-D . . . reliability flag corresponding to defect list information, 150-P . . . reliability flag corresponding to OPC pointer information, 151 . . . reliability flag, 300 . . . information recording/reproducing apparatus, 306 (308) . . . data input/output control device, 307 . . . operation control device, 310 . . . operation button, 311 . . . display panel, 351 . . . spindle motor, 352 . . . optical pickup, 353 . . . signal recording/reproducing device, 354 . . . CPU (drive control device), 355 (360) . . . memory, 359 . . . CPU (for host), 400 . . . host computer, LB . . . laser light, MA . . . management area, PCA0 . . . OPC area, SA1 (SA2) . . . spare area

BEST MODE FOR CARRYING OUT THE INVENTION

Hereinafter, the information recording medium, the information recording apparatus and method in embodiments of the present invention will be explained in order.

Embodiment of Information Recording Medium

Hereinafter, the information recording medium in an embodiment of the present invention will be explained.

An embodiment of the information recording medium is provided with: a plurality of record information recording areas (an OPC area, a user data area, a spare area, or the like) for recording therein record information; a management information recording area (a management area or the like) for recording therein a plurality of management information, each of which manages respective one of the plurality of record information recording areas; and a reliability information recording area (a management area or the like) for recording therein a plurality of reliability information (a reliability flag group or the like), each of which indicates reliability of whether or not respective one of the plurality of management information (space bitmap information or the like) is correctly updated.

According to the embodiment of the information recording medium of the present invention, it is possible to record the record information into the plurality of record information recording areas. Here, the "record information" in the present invention is data which is a main object of reproduction or execution, if recorded into the record information recording area which is the user data area or the like. For example, the "record information" is contents data, such as image data, audio data, and text data, and data for a computer program.

Alternatively, the "record information" is data which is a defect list for performing defect management, if recorded into the record information recording area which is the spare area or the like. Here, the "defect management" is to perform the recording operation of the record information while avoiding the position of a so-called defect, which is a general term for a scratch or dusts on the recording medium, or the deterioration of the recording medium, or the like. Alternatively, the "record information" is data for trial writing, such as dummy data, to perform a so-called Optimum Power Calibration (OPC) process in which the optimum recording power of laser light is detected, if recorded into the record information recording area which is the OPC area or the like.

Moreover, the plurality of management information is recorded in the management information recording area which is a recording management area (hereinafter referred to as the "management area", as occasion demands), for example. Here, the "management information" in the present invention is information for managing each of the plurality of record information recording areas. More specifically, one example of the "management information" for managing the record information recording area which is the user data area or the like is the space bitmap information for indicating whether or not the record information is already recorded at each position in the record information recording area. Alternatively, one example of the "management information" for managing the record information recording area which is the spare area or the like is the defect list information, in which address information is summarized in a table format and which is prepared or generated to perform the defect management. Alternatively, one example of the "management information" for managing the record information recording area which is the OPC area or the like is the OPC pointer information for pointing out the address information, such as a sector number, of a position for next trial writing in the OPC area. Incidentally, the management information may be updated or prepared at every opportunity that the recording is performed to the information recording medium, or may be updated or prepared when a series of recording is all completed and an operation of ejection or the like of the information recording medium is performed.

As described above, in recording the record information onto the information recording medium in the embodiment of the present invention, it is possible to specify the empty recording area, for example, on the basis of the management information which is the space bitmap information or the like and which is read before the actual recording operation, and record the record information at this position. Alternatively, it is possible to specify the position of a defect on the basis of the management information which is the defect list information or the like, and record the record information while avoiding this position. Alternatively, it is possible to specify a position for next trial writing on the basis of the management information which is the OPC pointer information or the like, and perform the OPC process efficiently.

Particularly, in the embodiment, the reliability information, such as a flag, which indicates the reliability of whether or not each of the plurality of management information is correctly updated to the newest information, is recorded into the reliability information recording area, such as the management area. In other words, the reliability information corresponds to each of the plurality of management information, one-on-one. Thus, it is possible to specify the management information considered to have low reliability, for example, easily and quickly, in accordance with the reliability information. Incidentally, the reliability information may be updated or prepared every time the management information is recorded onto the information recording medium, or may be updated or prepared when the recording of the management information regarding a series of recording is all completed and an operation of ejection or the like of the information recording medium is performed.

Since the information recording medium of the present invention is constructed in the above manner, even if at least one of the plurality of management information recorded in the management information recording area is not correctly updated to the newest information because of the cut-off of the power supply or the like, it is possible to specify the management information considered to have low reliability later, in accordance with the reliability information. Thus, it is possible to find or limit the record information recording area which is managed by the management information considered to have low reliability. Therefore, it is enough if the management information which manages the found or limited record information recording area is correctly updated to the newest information. Namely, it is unnecessary to perform verification or scanning, i.e. reading, with respect to the entire recording area of the information recording medium, and it is enough if the verification or scanning is performed with respect to only the found or limited record information recording area which is managed by the management information considered to have low reliability. Therefore, in the end, it is possible to greatly reduce a time length required for correctly updating all the management information to the newest information.

Specifically, the information recording medium in the embodiment is provided with the reliability information, such as a flag for indicating the reliability (hereinafter referred to as a "reliability flag", as occasion demands), which corresponds to each of the plurality of management information, to the number of the management information (refer to as the "management information number" as occasion demands). More specifically, the reliability information is provided, to the number of four reliability flags in total: i.e. one reliability flag corresponding to the space bitmap information of the L0 layer on the two-layer type optical disc; one reliability flag corresponding to the space bitmap information of the L1 layer; one reliability flag corresponding to the defect list information; and one reliability flag corresponding to the OPC pointer information, namely to the number of 4 bit data amount. As described above, the information recording medium in the present invention needs the reliability information having the data amount in proportion to the management information number, as compared to the conventional technique; however, it is possible to reduce a time length for correctly updating the management information to the newest information, to "1/(the management information number)"-times, e.g., "¼"-times as long time length, for example. In addition, it is possible to record "the management information number"-times as large data amount into one sector (2 KB) more than enough. In addition, it is obvious that as the capacity becomes larger as in the recording medium of BD-RE or the like, the effectiveness of the time length reduction becomes larger.

Particularly, in the embodiment, as described above, it is extremely effective if the various management information is classified and defined depending on how to use the recording area. For example, it is extremely effective if the various management information is classified correspondingly to the spare area, the user data area, the OPC area, and the like. This is because a period and timing in which these recording areas are used or the data is recorded into the recording areas are similar. Thus, if the reliability information is set with respect to the management information which manages each of the recording areas, the data is highly possibly recorded in a short time into a block which is located spatially close, by spatial locality and timing locality, even if the power supply is cut off or a similar situation occurs. Thus, it is possible to minimize the range of the recording area which is specified such that the reliability of the various management information is low. Therefore, it is possible to further reduce of a scanning time length for scanning the recording area and a time length for correctly updating the various management information to the newest information and improve the efficiency of them.

In one aspect of the embodiment of the information recording medium of the present invention, the plurality of reliability information is collectively recorded in the reliability information recording area.

According to this aspect, since each reliability information for respective one of the plurality of management information is collectively recorded in one reliability information recording area, as the reliability flag group, for example, it is possible to easily obtain each reliability information for respective one of the plurality of management information in one access or one reading operation.

In another aspect of the embodiment of the information recording medium of the present invention, the management information recording area and the reliability information recording area are unified.

According to this aspect, since the plurality of management information and the plurality of reliability information, each of which corresponds to respective one of the plurality of management information, are collectively recorded in the management information recording area, such as the management area, for example, it is possible to easily obtain the management information and the reliability information in one access or one reading operation.

In another aspect of the embodiment of the information recording medium of the present invention, the plurality of management information includes at least one information out of space bitmap information for identifying an already recorded state or an unrecorded state with respect to each block of the record information recording area, defect list information for performing defect management, and OPC pointer information for identifying a position at which next trial writing is performed.

According to this aspect, for example, by that the space bitmap information is correctly updated to the newest information as the management information, it is possible to accurately identify the already recorded state or the unrecorded state in the record information recording area, such as the user data area. Specifically, the space bitmap information is information in which a flag for indicating the recording state of "already recorded" or "unrecorded (or blank)" is summarized in a small area into which the recording area of the information recording medium is divided. More specifically, the small area is a logical block or a physical block hereinafter referred to as a "1 Error Correcting Code (ECC) block", as occasion demands) which is specified by the sector number of the recording area of the information recording medium. For example, the flag which can identify the recording state of either "already recorded" or "unrecorded state" is appended to each of the ECC blocks, for example. The space bitmap information is information in which these flags are summarized. Therefore, in recording the record information, the recording area that has relatively many unrecorded ECC blocks is specified, for example, on the basis of the space bitmap information read before the actual recording operation, and it is possible to record the record information into the specified recording area.

Particularly, by using the information of flag or the like as the space bitmap information, it is possible to easily and quickly recognize the distribution of unrecorded ECC blocks, which are read upon the insertion of the information recording medium, for example, and it is possible to update the information of flag or the like corresponding to the 1ECC block which is already recorded. Moreover, one type of information, such as the flag, can indicate the distribution of unrecorded ECC blocks. Therefore, it is possible to reduce the data amount. Incidentally, in the space bitmap information, a flag of "1" is placed in the "already recorded" small area, i.e., the "already recorded" 1ECC block, and a flag of "0" is placed in the "unrecorded" small area, i.e., the "unrecorded" 1ECC block, for example.

Moreover, according to this aspect, for example, by that the defect list information is correctly update to the newest information as the management information, it is possible to accurately identify a defect in the record information recording area, such as the spare area. Thus, it is possible to accurately and quickly perform the recording operation of the record information while avoiding the position of the defect by virtue of the defect management.

In addition, according to this aspect, for example, by that the OPC pointer information is correctly update to the newest information as the management information, it is possible to accurately identify a position for next trial writing in the record information recording area, such as the OPC area. Thus, it is possible to accurately and quickly detect the optimum recording power of laser light by virtue of the OPC process.

In another aspect of the embodiment of the information recording medium of the present invention, the management information and the reliability information are written in a table format for each management information.

According to this aspect, if the management information is not correctly updated to the newest information, it is possible to quickly and accurately specify the management information which is not updated to the newest information, by the reliability information, such as the flag, in a table, for example.

In another aspect of the embodiment of the information recording medium of the present invention, the reliability information includes an inconsistency flag which indicates that the management information and a recording state of the record information recording area managed by the management information are inconsistent.

According to this aspect, the reliability information includes an inconsistency flag which indicates inconsistency between the management information (e.g. space bitmap information), and the recording state of record information recording area (e.g. the recording state of a user data area on one layer). Thus, it is possible to specify the management information considered to have low reliability or to be inconsistent, for example, easily and quickly, in accordance with the inconsistency flag.

Consequently, even if the management information recorded in the management information recording area and the recording state of the record information recording area, such as the data area of one recording layer, for example, are inconsistent because of the cut-off of the power supply or the like, it is possible to specify the management information considered to be inconsistent later, in accordance with the inconsistency flag. Thus, it is possible to find or limit the record information recording area which is managed by the management information specified to be inconsistent. Therefore, it is enough if the management information which manages the found or limited record information recording area is correctly updated to the newest information. Namely, it is unnecessary to perform verification or scanning, i.e. reading, with respect to the entire recording area of the information recording medium, and it is enough if the verification or scanning is performed with respect to only the found or limited record information recording area which is managed by the management information considered to be inconsistent. Therefore, in the end, it is possible to greatly reduce a time length required for correctly updating all the management information to the newest information. In addition, it is obvious that as the capacity becomes larger as in the recording medium of BD-RE or the like, the effectiveness of the time length reduction becomes larger.

In an aspect associated with the reliability information, the information recording medium may have a plurality of recording layers, and the reliability information may include the inconsistency flag for each of the plurality of recording layers.

By virtue of such construction, the reliability information may be provided, to the number of two reliability flags in total: i.e. one reliability flag corresponding to the management information of the L0 layer on the two-layer type optical disc; and one reliability flag corresponding to the management information of the L1 layer, namely to the number of 2 bit data amount.

As a result, it is unnecessary to perform verification or scanning, i.e. reading, with respect to the entire recording area of the information recording medium, and it is enough if the verification or scanning is performed with respect to only the recording area of the L0 layer, indicated to be inconsistent by the inconsistency flag corresponding to the management information in the L0 layer, for example. Therefore, in the end, it is possible to greatly reduce a time length required for correctly updating all the management information to the newest information.

Moreover, in an aspect associated with the reliability information, the management information may be space bitmap information for identifying an already recorded state or an unrecorded state with respect to each block of the record information recording area, and the reliability information may include the inconsistency flag which indicates inconsistency of the space bitmap information.

By virtue of such construction, the reliability information may be provided, to the number of two reliability flags in total: i.e. one reliability flag corresponding to the space bitmap information of the L0 layer on the two-layer type optical disc; and one reliability flag corresponding to the space bitmap information of the L1 layer, namely to the number of 2 bit data amount.

As a result, it is unnecessary to perform verification or scanning, i.e. reading, with respect to the entire recording area of the information recording medium, and it is enough if the verification or scanning is performed with respect to only the recording area of the L0 layer, indicated to be inconsistent by the inconsistency flag corresponding to the space bitmap information in the L0 layer, for example. Therefore, in the end, it is possible to greatly reduce a time length required for correctly updating all the space bitmap information to the newest information.

Embodiments of Information Recording Apparatus

Hereinafter, the information recording apparatus in embodiments of the present invention will be explained.

An embodiment of the information recording apparatus of the present invention is an information recording apparatus provided with: a recording device capable of recording record information onto the above-described information recording medium in the embodiment; a reading device for reading the reliability information from the reliability information recording area; a determining device for determining the management information corresponding to the reliability information read by the reading device; and a controlling device for controlling the recording device to record the record information on the basis of the determined management information.

According to the embodiment of the information recording apparatus of the present invention, in the operation thereof, the reliability information is read by the reading device, such as a processor (CPU: Central Processing Unit), a demodulator or decoder, and an optical pickup, from the reliability information recording area of the information recording medium before the actual recording operation. The read reliability information may be stored by a storing device, such as a processor and a memory, for example. Then, the management information (e.g. the space bitmap information, the defect list information, the OPC pointer information, or the like) corresponding to the read reliability information is determined by the determining device, such as a processor. Then, the actual recording of the record information is performed by the recording device, such as a processor, an encoder, and an optical pickup, in the record information recording area, such as an unrecorded block, an unrecorded block without a defect, and an unrecorded block in the OPC area, on the basis of the determined management information.

Therefore, according to the embodiment, even if at least one of the plurality of management information recorded in the management information recording area is not correctly updated to the newest information because of the cut-off of the power supply or the like, it is possible to specify the management information considered to have low reliability later, in accordance with the reliability information. Thus, it is possible to find or limit the record information recording area which is managed by the management information considered to have low reliability. Therefore, it is enough if the management information which manages the found or limited record information recording area is correctly updated to the newest information. Namely, it is unnecessary to perform verification or scanning, i.e. reading, with respect to the entire recording area of the information recording medium, and it is enough if the verification or scanning is performed with respect to only the found or limited record information recording area which is managed by the management information considered to have low reliability. Therefore, in the end, it is possible to greatly reduce a time length required for correctly updating all the management information to the newest information.

Incidentally, in response to the various aspects of the embodiment of the information recording medium of the present invention described above, the embodiment of the information recording apparatus of the present invention can adopt various aspects.

In one aspect of the embodiment of the information recording apparatus of the present invention, the information recording apparatus is further provided with: a first updating device for temporarily updating the reliability information corresponding to the determined management information to indicate that the reliability information is not reliable; a verifying device for verifying the record information recording area managed by the determined management information; and a second updating device for correctly updating the management information after the verification by the verifying device is completed, and definitely updating the reliability information corresponding to the updated management information to indicate that the reliability information is reliable.

According to this aspect, the reliability information corresponding to the determined management information is temporarily updated by the first updating device, such as a processor, an encoder, and an optical pickup, to the newest information considered to have little reliability. Then, the verification of the actual record information is performed by the verifying information, such as a processor, an encoder, and an optical pickup, with respect to the record information recording area which is managed by the determined management information. Then, the management information is updated by the second updating device, such as a processor, an encoder, and an optical pickup, after the verification by the verifying device is completed with respect to the record information recording area. At the same time, or nearly at the same time, the reliability information corresponding to the updated management information, i.e. the reliability information corresponding to the management information which is temporarily updated to the newest information considered to have little reliability, is definitely updated to the newest information considered to have reliability. Incidentally, every time the verifying device verifies the information recording medium, the second updating device may update the management information in proper timing. Namely, the second updating device may partially update the management information at each verification, or correctively update the management information after a series of verification is completed.

Therefore, even if at least one of the plurality of management information recorded in the management information recording area is not correctly updated to the newest information because of the cut-off of the power supply or the like, it is possible to specify the management information considered to have low reliability, more accurately, later, in accordance with the reliability information.

Another embodiment of the information recording apparatus of the present invention is an information recording apparatus for recording record information onto an information recording medium provided with: a plurality of record information recording areas for recording therein the record information; a management information recording area for recording therein a plurality of management information, each of which manages respective one of the plurality of record information recording areas; and an inconsistency flag recording area for recording therein an inconsistency flag indicating whether or not each of the plurality of management information is correctly updated, the information recording apparatus provided with: a record information recording device for recording the record information; a management newest information recording device for recording the management information; and a inconsistency flag recording device for recording the inconsistency flag, the inconsistency flag recording device recording one symbol information indicating an inconsistency condition as the inconsistency flag before starting the recording by the management information recording device.

According to the another embodiment of the information recording apparatus of the present invention, even if (i) at least one of the plurality of management information recorded in the management information recording area is not correctly updated to the newest information, or (ii) the management information and a recording state of the record information recording area are inconsistent, because of the cut-off of the power supply or the like, it is possible to specify the management information considered to have low reliability or to be inconsistent, in accordance with one symbol information (e.g. "1" binary which indicates the inconsistency) recorded as the inconsistency flag. Thus, it is possible to find or limit the record information recording area which is managed by the management information considered to be inconsistent. Therefore, it is enough if the management information which manages the found or limited record information recording area is correctly updated to the newest information. Namely, it is unnecessary to perform verification or scanning, i.e. reading, with respect to the entire recording area of the information recording medium, and it is enough if the verification or scanning is performed with respect to only the found or limited record information recording area which is managed by the management information considered to have low reliability or to be inconsistent. Therefore, in the end, it is possible to greatly reduce a time length required for correctly and consistently updating all the management information to the newest information.

Incidentally, in response to the various aspects of the embodiment of the information recording medium of the present invention described above, the another embodiment of the information recording apparatus of the present invention can adopt various aspects.

In one aspect of the another embodiment of the information recording apparatus of the present invention, the inconsistency flag recording device records another symbol information indicating a consistency condition as the inconsistency flag after ending the recording by the management information recording device According to this aspect, after the recording operation is normally ended without cut-off of the power supply or the like, if (i) all management information recorded in the management information recording area is correctly updated to the newest information, or (ii) the management information and a recording state of the record information recording area are consistent, the other symbol information (e.g. "0" binary which indicates the consistency) is recorded as the inconsistency flag.

Thus, it is possible to realize that all the plurality of management information is highly reliable without inconsistency, in accordance with the other symbol information indicating the consistency condition.

Embodiments of Information Recording Method

Hereinafter, the information recording method in embodiments of the present invention will be explained.

An embodiment of the information recording method of the present invention is an information recording method in an information recording apparatus provided with a recording device capable of recording the record information onto the above-described information recording medium in the embodiment, the information recording method provided with: a reading process of reading the reliability information from the reliability information recording area; a determining process of determining the management information corresponding to the reliability information read by the reading process; and a controlling process of controlling the recording device to record the record information on the basis of the determined management information.

According to the embodiment of the information recording method of the present invention, as in the case of the embodiment of the information recording apparatus of the present invention described above, even if at least one of the plurality of management information recorded in the management information recording area is not correctly updated to the newest information because of the cut-off of the power supply or the like, it is possible to specify the management information considered to have low reliability later, in accordance with the reliability information. Thus, it is possible to find or limit the record information recording area which is managed by the management information specified to have low reliability. Therefore, it is enough if the management information which manages the found or limited record information recording area is correctly updated to the newest information. Therefore, in the end, it is possible to greatly reduce a time length required for correctly updating all the management information to the newest information.

Incidentally, in response to the various aspects of the embodiment of the information recording apparatus of the present invention described above, the embodiment of the information recording method of the present invention can adopt various aspects.

In one aspect of the embodiment of the information recording method of the present invention, the information recording method is further provided with: a first updating process of temporarily updating the reliability information corresponding to the determined management information to indicate that the reliability information is not reliable; a verifying process of verifying the record information recording area managed by the determined management information; and a second updating process of correctly updating the management information after the verification by the verifying process is completed, and definitely updating the reliability information corresponding to the updated management information to indicate that the reliability information is reliable.

According to this aspect, as in the case of one aspect of the embodiment of the information recording apparatus of the present invention described above, even if at least one of the plurality of management information recorded in the management information recording area is not correctly updated to the newest information because of the cut-off of the power supply or the like, it is possible to specify the management information considered to have low reliability, more accurately, later, in accordance with the reliability information.

Another embodiment of the information recording method of the present invention is an information recording method in an information recording apparatus for recording record information onto an information recording medium provided with: a plurality of record information recording areas for recording therein the record information; a management information recording area for recording therein a plurality of management information, each of which manages respective one of the plurality of record information recording areas; and an inconsistency flag recording area for recording therein an inconsistency flag indicating whether or not each of the plurality of management information is correctly updated, the information recording method provided with: a record information recording process of recording the record information; a management information recording process of recording the management information; and an inconsistency flag recording process of recording the inconsistency flag, the inconsistency flag recording process recording one symbol information indicating an inconsistency condition as the inconsistency flag before starting the recording by the management information recording device.

According to the another embodiment of the information recording method of the present invention, it is possible to receive the same various benefits as in the above-mentioned another embodiment of the information recording apparatus of the present invention.

Incidentally, in response to the various aspects of the embodiment of the information recording apparatus of the present invention described above, the embodiment of the information recording method of the present invention can adopt various aspects.

In one aspect of the another embodiment of the information recording method of the present invention, the inconsistency flag recording process records another symbol information indicating a consistency condition as the inconsistency flag after ending the recording by the management information recording process.

According to this aspect, it is possible to receive the same various benefits as in the above-mentioned one aspect of the another embodiment of the information recording apparatus of the present invention.

Embodiment of Computer Program

Hereinafter, the computer program in an embodiment of the present invention will be explained.

An embodiment of the computer program of the present invention is a computer program of instructions for tangibly embodying a program of instructions executable by a computer provided in the above-described embodiment of the information recording apparatus (including its various aspects), to make the computer function as at least one portion of the reading device, the determining device, the controlling device, and the recording device.

According to the embodiment of the computer program of the present invention, the above-mentioned embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Moreover, the above object of the present invention can be achieved by an embodiment of a computer program product in a computer-readable medium of the present invention tangibly embodies a program of instructions executable by a computer provided for the above-mentioned embodiment of the information recording apparatus of the present invention (including its various aspects), the program making the computer function as at least one portion of the reading device, the determining device, the controlling device, and the recording device.

According to the embodiment of the computer program product of the present invention, at least one portion of the reading device, the determining device, the controlling device, and the recording device of the present invention may be embodied relatively easily, by reading and running the computer program product from a record medium, such as a ROM, a CD-ROM, a DVD-ROM, a hard disk and so on, which stores the computer program thereon, or by downloading the computer program product to the computer via the communication device and running it. More specifically, the computer program product may be made of computer readable codes (or computer readable commands) to make the computer function as at least one portion of the reading device, the determining device, the controlling device, and the recording device Incidentally, in response to the various aspects of the embodiments of the information recording apparatus described above, the embodiment of the computer program of the present invention can also adopt various aspects.

These effects and other advantages of the present invention become more apparent from the following examples.

As explained above, according to the embodiment of the information recording medium of the present invention, it is provided with: the plurality of record information recording areas; the management information recording area; and the reliability information recording area, so that even if the management information is not updated on the information recording medium in various processes because of the cut-off of the power supply or the like, it is possible to greatly reduce a time length required for correctly updating the management information to the newest information. According to the embodiments of the information recording apparatus of the present invention, it is provided with: the reading device; the determining device; the controlling device; the recording device; or various updating devices, so that even if the management information is not updated on the information recording medium in various processes because of the cut-off of the power supply or the like, it is possible to greatly reduce a time length required for correctly updating the management information to the newest information. According to the embodiments of the information recording method of the present invention, it is provided with: the reading process; the determining process; the controlling process; the recording device; or various updating processes, so that even if the management information is not updated on the information recording medium in various processes because of the cut-off of the power supply or the like, it is possible to greatly reduce a time length required for correctly updating the management information to the newest information. According to the embodiment of the computer program of the present invention, it makes a computer function as the information recording apparatus of the present invention described above, so that even if the management information is not updated on the information recording medium in various processes because of the cut-off of the power supply pr the like, it is possible to greatly reduce a time length required for correctly updating the management information to the newest information.

EXAMPLES (Information Recording Medium)

Next, with reference to FIGS. 1 to FIG. 6, a write-once, two-layer type optical disc in an example of the information recording medium of the present invention will be explained in detail on the basis of the drawings.

Firstly, the basic structure of a write-once, two-layer type optical disc in the example of the information recording medium of the present invention will be explained with reference to FIG. 1. FIG. 1 are a substantial plan view showing a basic structure of an optical disc having a plurality of recording areas in an example of an information recording medium of the present invention (FIG. 1(a)), and a schematic cross sectional view of the optical disc and a corresponding conceptual diagram showing a recording area structure in the radial direction (FIG. 1(b)).

As shown in FIG. 1(a) and FIG. 1(b), an optical disc 100 has a recording surface on the disc main body with a diameter of about 12 cm, as is a DVD. On the recording surface, the optical disc 100 is provided with: a lead-in area 101; a data area 102; and a lead-out area 103 or a middle area 104, which are associated with the example, with a center hole 1 as the center. Particularly, the lead-in area 101 is provided with, for example, an OPC area PCA0 or PCA1 for performing a so-called Optimum Power Calibration (OPC) process in which the optimum recording power of laser light LB is detected. Then, a recording layer or the like is laminated on a transparent substrate 106 of the optical disc 100, for example. In each recording area of the recording layer, spirally or concentrically with the center hole 1 as the center, tracks 10, such as groove tracks and land tracks, are placed alternately. Moreover, on the track 10, data is divided by a unit of ECC block 11 and recorded. The ECC block 11 is a self-contained block of data and correction codes. On DVD media, this is a group of 16 DVD sectors.

Incidentally, the present invention is not particularly found or limited to the optical disc having three areas as described above. For example, even if the lead-in area 101 and the lead-out area 103 or the middle area 104 do not exist, a data structure explained below can be constructed. Moreover, as described later, the lead-in area 101 and the lead-out area 103 or the middle area 104 may be further segmentized.

Particularly, the optical disc 100 in the example, as shown in FIG. 1(b), has such a structure that a L0 layer and a L1 layer, which constitute one example of the "first and second recording layers" of the present invention as descried later, respectively, are laminated on the transparent substrate 106. Upon the record and reproduction of such a two-layer optical disc 100, the recording/reproduction in the L0 layer or the L1 layer is performed, depending on which recording layer is provided with the focusing position of the laser light LB, emitted from the upper to the lower side. Moreover, the optical disc 100 in the example is not found or limited to a two-layer, one side type, i.e., a dual layer, but may be a two-layer double side type, i.e. a dual layer double side. Furthermore, the optical disc 100 in the example is not found or limited to the optical disc having the recording layers of a two-layer type, as described above, but may be an optical disc of a multi-layer type which is three or more layers.

In addition, a recording/reproduction procedure in the two-layer type optical disc may be a parallel manner in which the directions of track passes are equal between the two recording layers, for example, or may be an opposite manner in which the directions of track passes are opposite between the two recording layers, for example. Incidentally, the recording/reproduction in the parallel manner or in the opposite manner of the two-layer type optical disc in the example and the data structure of each layer will be described later.

Figure 2:
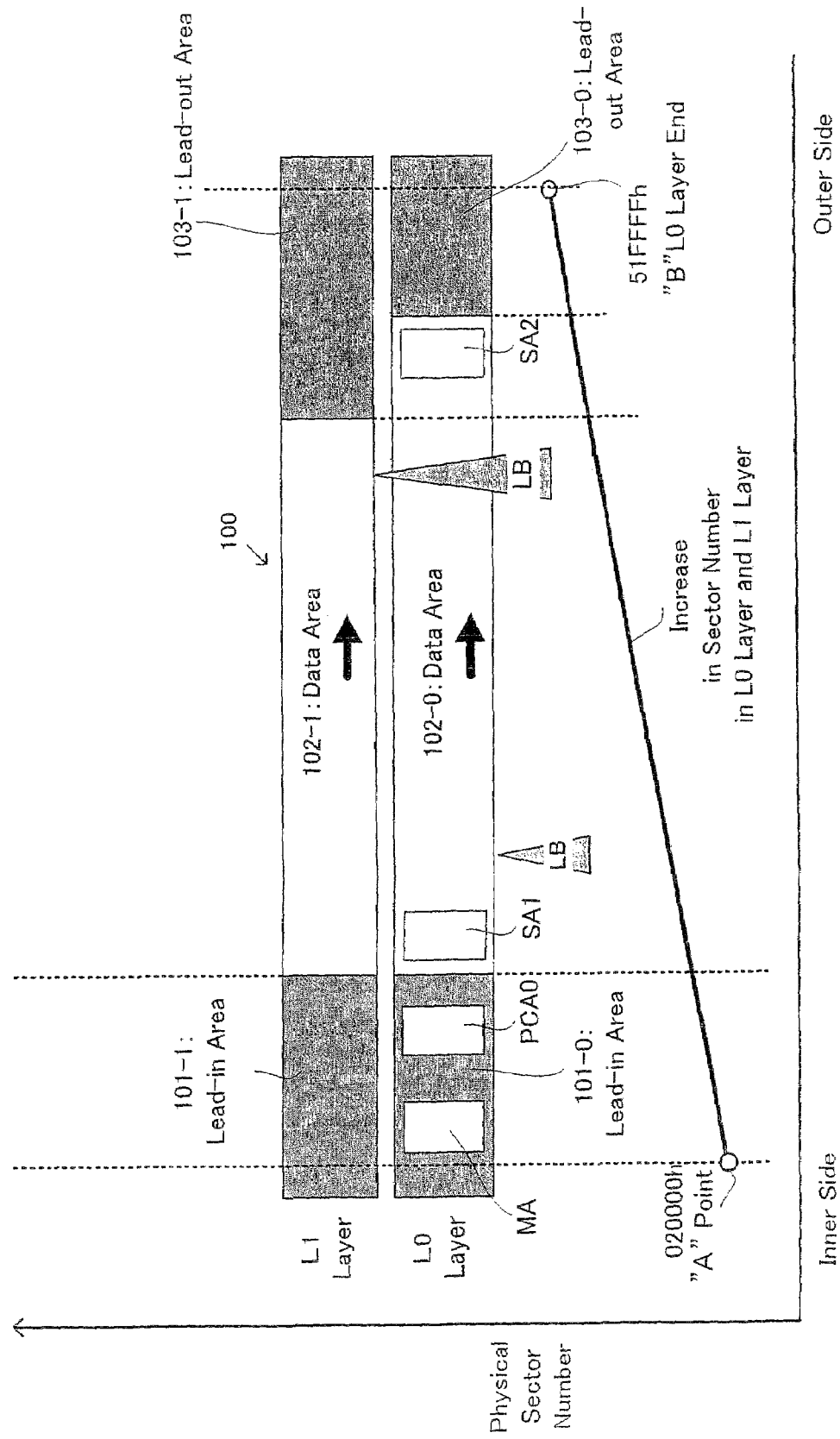
FIG. 2 is a conceptual graph schematically showing a data structure of the optical disc in the embodiment of the information recording medium of the present invention, a physical sector number of a physical sector constituting an ECC block in the recording area of the optical disc, and a recording or reproducing method in a parallel manner of the optical disc.

Next, with reference to FIG. 2, a data structure of the two-layer type optical disc in the example of the information recording medium of the present invention, a physical sector number of a physical sector constituting an ECC block in the recording area of the optical disc, and the record or reproduction procedure in the parallel manner of the optical disc will be explained. FIG. 2 is a conceptual graph schematically showing the data structure of the optical disc in the example of the information recording medium of the present invention, the physical sector number (hereinafter referred to as a sector number, as occasion demands) of a physical sector constituting an ECC block in the recording area of the optical disc, and a recording or reproducing method in the parallel manner of the optical disc. The vertical axis indicates the sector number expressed in the hexadecimal notation, and the horizontal axis indicates the relative position in the radial direction of the optical disc.

As shown in FIG. 2, the two-layer type optical disc 100 in the example of the information recording medium of the present invention is provided with: a not-illustrated substrate; and two recording layers laminated on the substrate, i.e., the L0 layer and the L1 layer. Specifically, the L0 layer is provided with: a lead-in area 101-0; a data area 102-0; and a lead-out area 103-0, from the inner to the outer circumferential side. The lead-in area 101-0 is provided with: an OPC area PCA0 for the OPC process; a Recording Management area MA in which the management information is recorded; and the like.

On the other hand, the L1 layer is provided with: a lead-in area 101-1; a data area 102-1; and a lead-out area 103-1, from the inner to the outer circumferential side. The lead-in area 101-1 may be also provided with a not-illustrated OPC area and the like.

Since the two-layer type optical disc 100 is constructed in the above manner, upon the record or reproduction of the optical disc 100, the laser light LB is emitted from the not-illustrated substrate side, i.e. from the lower side in FIG. 2, to the upper side, by a not-illustrated optical pickup of an information recording/reproducing apparatus in an example of the information recording apparatus of the present invention, which will be described later. Moreover, the focus distance and the like are controlled, and the displacement distance and the direction in the radial direction of the optical disc 100 are controlled. By this, the data is recorded into each recording layer, or the recorded data is reproduced.

Particularly, the parallel manner is adopted as the record or reproduction procedure of the two-layer type optical disc in the example of the information recording medium of the present invention. In the parallel manner, when the record or reproduction in the L1 layer is started after the record or reproduction in the L0 layer is finished, the optical pickup that is on the most outer circumference of the optical disc needs to be displaced again to the most inner circumference, so that it takes more time by that much to change from the L0 layer to the L1 layer.

Alternatively, the opposite manner may be adopted as the record or reproduction procedure of the two-layer type optical disc in the example of the information recording medium of the present invention. In the opposite manner, the record or reproduction of the two-layer type optical disc is performed in such a manner that the optical pickup of the information recording/reproducing apparatus in the example of the information recording apparatus of the present invention is displaced from the inner to the outer circumferential side in the L0 layer, i.e. in the right direction shown with an arrow in FIG. 2, while, as opposed to the case of L0 layer, the optical pickup is displaced from the outer to the inner circumferential side in the L1 layer, i.e. in the left direction opposite to an arrow in FIG. 2. In the opposite manner, if the record or reproduction in the L0 layer is finished, when the record or reproduction in the L1 layer is started, the optical pickup that is on the most outer circumference of the optical disc does not need to be displaced again to the most inner circumference. For example, it is enough if the focus distance is changed from the L0 layer to the L1 layer in a buffer area, such as the middle area, so that there is such an advantage that the changing time from the L0 layer to the L1 layer is shortened than that of the parallel manner. Thus, the opposite manner is adopted in the recording of the large-amount content information.

Again, the explanation returns to the parallel manner as the record or reproduction procedure of the two-layer type optical disc in the example of the information recording medium of the present invention. Specifically, in the case of the parallel manner, firstly, in the L1 layer, as the optical pickup is displaced in the lead-in area 101-0, the data area 102-0, and the lead-out area 103-0, from the inner to the outer circumferential side, the sector number in the recording area of the optical disc 100 increases. More specifically, the optical pickup sequentially accesses the start position of the lead-in area 101-0 (refer to an A point with a sector number of "020000h" in FIG. 2), the start position of the data area 102-0, and the end position of the data area 102-0, and is displaced to the end position of the lead-out area 103-0 (refer to a B position with a sector number of "51FFFFh" in FIG. 2) which function as a buffer. By this, the record or reproduction in the L0 layer is performed.

On the other hand, even in the L1 layer, as in the L0 layer, as the optical pickup is displaced in the lead-in area 101-1, the data area 102-1, and the middle area 104-1, from the inner to the outer circumferential side, the sector number in the recording area of the optical disc 100 increases. More specifically, the optical pickup sequentially accesses the start position of the lead-in area 101-1 (refer to the A point with a sector number of "020000h" in FIG. 2), the start position of the data area 102-1, and the end position of the data area 102-1, and is displaced to the end position of the lead-out area 103-1 (refer to the B position with a sector number of "51FFFFh" in FIG. 2). By this, the record or reproduction in the L1 layer is performed.

Figure 3:
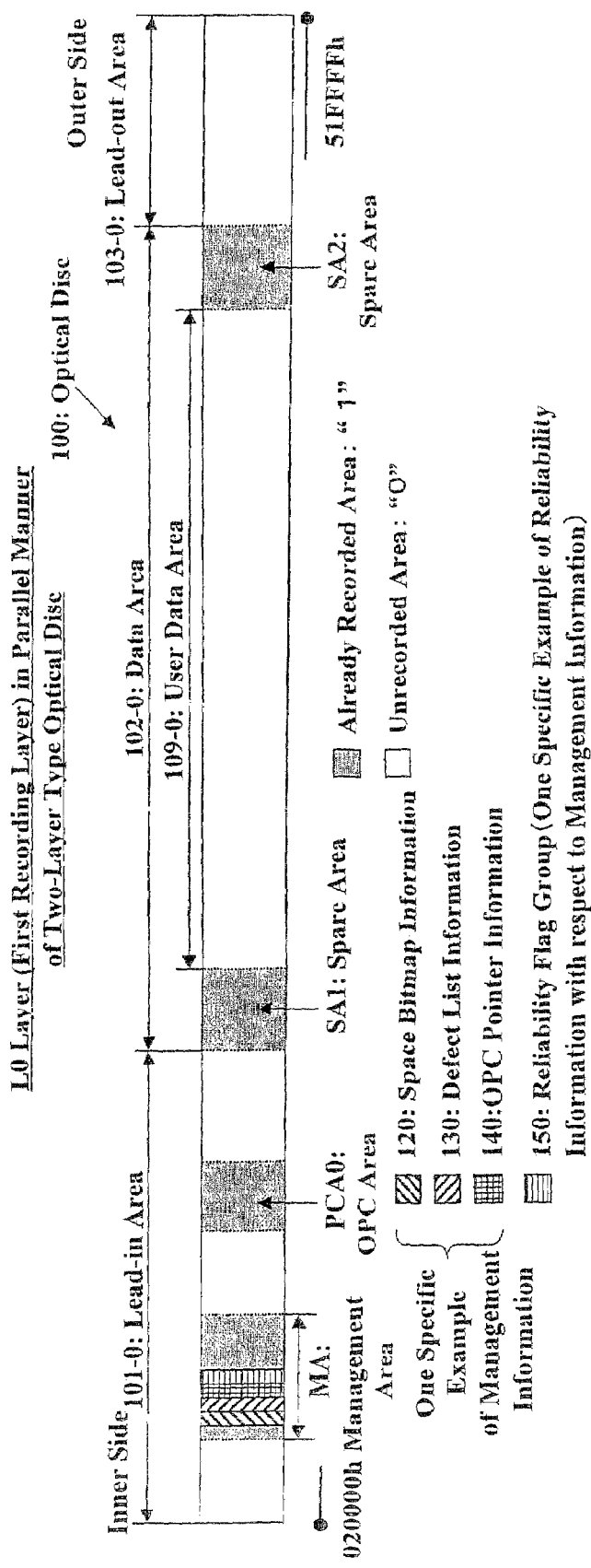
FIG. 3 is a schematic data structure diagram showing one specific example of the structure of the recording area of the optical disc in the embodiment of the information recording medium of the present invention, the recording area in which data is already recorded on the optical disc, and the sector number.

Next, with reference to FIG. 3, one specific example of the structure of the recording area of the optical disc in the example of the information recording medium of the present invention, the recording area in which data is already recorded on the optical disc, and the sector number will be explained. FIG. 3 is a schematic data structure diagram showing one specific example of the structure of the recording area of the optical disc in the example of the information recording medium of the present invention, the recording area in which data is already recorded on the optical disc, and the sector number. Incidentally, the structure of the recording area of the optical disc is substantially the same as that in FIG. 2 described above. Moreover, for convenience of explanation, FIG. 3 only shows the L0 layer of the two-layer type optical disc in the example of the information recording medium of the present invention.

As shown in FIG. 3, space bitmap information 120, defect list information 130, and OPC pointer information 140, and the like, which constitute one specific example of the "management information" in the present invention, are recorded in the management area MA, which constitutes one specific example of the "management information recording area" in the present invention.

Here, the space bitmap information 120 is information in which information of a flag or the like is summarized, wherein the flag indicates a recording state of "already recorded" or "unrecorded (or blank)" in each block regarding the entire optical disc 100. Specifically, in the space bitmap information 120, the information of flag or the like is summarized with respect to the entire optical disc 100 (all the ECC blocks), in which the flag can discriminate the recording state of whether to be "already recorded" or "unrecorded, for each block specified by the address of the sector in the recording area of the information recording medium. Particularly, the space bitmap information 120 is firstly read by the information recording apparatus for recording the data onto the optical disc 100, before the actual recording operation. Then, the space bitmap information 120 is updated or prepared in a memory built in the information recording apparatus at every opportunity that the recording is performed to the information recording medium. Then, such updated or prepared newest space bitmap information is written into the management area MA, in proper timing, e.g. whenever the recording is finished. Alternatively, it is collectively written, in performing an operation of EJECT (the ejection of the disc) or the like. By this, as long as the updating or generation of the space bitmap information 120 completes normally, the effective space bitmap information 120 is written on the optical disc 100. Incidentally, in the example, a flag of "1" is placed in the space bitmap information 120 for the "already recorded" area (e.g. the 1ECC block or the like specified by the sector number), and a flag of "0" is placed in the space bitmap information 120 for the "unrecorded" area. Specifically, as shown in FIG. 3, in one specific example of the example, the sector number for indicating position information in the recording area is expressed in the hexadecimal notation, such as "51FFFFh". Incidentally, the area painted in gray in FIG. 3 is the already recorded area, and an empty area which is not painted is the unrecorded area. More specifically, in a DVD-RW having a recording capacity of 4.7 GB, one sector is 2048 byte, and one block is 16 sectors (about 32.8 kB). Thus, the data mount of the space bitmap information 120 recorded by this block unit is 4.7 GB/(2048×16)byte/8=about 17.9 kB, which can be sufficiently filled in one block. Incidentally, the space bitmap information 120 may not be the information about the entire recording area of the optical disc 100, but may be the information about only a user data area UD or the lead-in area 101, for example.

Incidentally, in place of the space bitmap information 120, sequential record information (track information) having index numbers of "0" to "99" or the like may be used, for example. Alternatively, for example, disc management information or the like may be used. Alternatively, for example, pointer which indicates a recording position if the Temporary Defect Management Structure (TDMS) of write once media is distributed and recorded may be used.

The defect list information 130 is management information which is prepared for defect management and in which address information is summarized in a table format, for example. More specifically, there is the defect management, as a technique for improving the reliability of recording and reading the record data on the high-density recording medium, such as an optical disc, a magnetic disc, and an optical magneto disc. Namely, when there is a defect, the data to be recorded or already recorded at the position of the defect is recorded into another area on the recording medium (referred to as a "spare area SA1 or SA2). As described above, by evacuating the record data which likely cannot be recorded or read due to the defect, to the spare area SA1 or SA2, it is possible to improve the reliability of recording and reading the record data. In general, the defect list information is prepared to perform the defect management. In the defect list information, the address which indicates the position of a defect on the recording medium (a so-called evacuation source address") and the address which indicates the position of the spare area to which the data to be recorded or already recorded at the position of the defect is evacuated (e.g. a recording position in the spare area: a so-called "evacuation destination address") are recorded. The defect list information is prepared when the recording medium is initialized or formatted. Moreover, the defect list information is also prepared when the record data is recorded onto the recording medium. When the record data is recorded several times, the defect list information is prepared or updated whenever the record data is recorded onto the recording medium. When the record data is recorded onto the recording medium, the defect list information is referred to. By this, it is possible to record the record data onto the recording medium while avoiding the position of a defect. On the other hand, even when the record data recorded on the recording medium is reproduced, the defect list information is referred to. As described above, by virtue of the defect management, it is possible to certainly read the record data recorded in the normal recording area and the record data recorded in the spare area because of the presence of a defect, on the basis of the defect list information.

The OPC pointer information 140 indicates the address information, such as the sector number, of a position for next trial writing in the OPC area, in performing the OPC process in which the optimum recording power of the laser light is detected. Particularly, in the write-once media, the OPC pointer information 140 indicates an unrecorded area.

Particularly, in the example, a reliability flag group 150, which constitutes one specific example of the "reliability information" or the "inconsistency flag" of the present invention, is recorded in the management area MA, which constitutes one specific example of the "reliability information recording area" of the present invention. The reliability flag group 150 is a group of flags for indicating the reliability of whether or not various management information is updated to the newest information. Specifically, for example, in the reliability flag group 150, each flag is summarized for respective one of the various management information, wherein the flag indicates the reliability of whether or not the management information, such as the space bitmap information 120, the defect list information, and the OPC pointer information, is correctly updated to the newest information. More specifically, the reliability flag group 150 is information in which the followings are summarized (total data amount: 2+1+1=4 bits): a flag for indicating the reliability of whether or not the space bitmap information 120 corresponding to each of the L0 layer and the L1 layer is correctly updated to the newest information (data amount: 2 bit in total; one bit for L0 layer and one bit for L1 layer), a flag for indicating the reliability of whether or not the defect list information is correctly updated to the newest information (data amount: 1 bit), and a flag for indicating the reliability of whether or not the OPC pointer information is correctly updated to the newest information (data amount: 1 bit). Incidentally, since each reliability information for respective one of the plurality of management information is collectively recorded in one management area MA, as the reliability flag group 150 in the example, it is possible to easily obtain each reliability information for respective one of the plurality of management information, in one access or one reading operation. Moreover, since the plurality of management information and the reliability flag group 150 corresponding to each of the plurality of management information are collectively recorded in the management area MA, it is possible to easily obtain the management information and the reliability flag group 150, in one access or reading operation.

More specifically, as described later, for example, if the space bitmap information 120 in the L0 layer does not have consistency with the actual recording state of the L0 layer and is not correctly updated to the newest information, the flag of "1" is placed in a reliability flag 150-S0, which will be described later. On the other hand, if the space bitmap information 120 in the L0 layer has consistency with the actual recording state of the L0 layer and is correctly updated to the newest information, the flag of "0" is placed. The same manner applies in a reliability flag 150-D corresponding to the defect list information and a reliability flag 150-P corresponding to the OPC pointer information, which will be described later.

Next, with reference to FIG. 4, one specific example of the reliability information in the optical disc in the example of the information recording medium of the present invention will be explained. FIG. 4 is a conceptual table showing the physical sector number in the recording area, the space bitmap information, and the reliability flag group which is one specific example of the reliability information corresponding to various management information, in the optical disc in the example of the information recording medium of the present invention.

On the table shown in FIG. 4, columns show: the sector numbers of the head and the tail of the ECC block unit in the L0 layer; the space bitmap information 120 in the L0 layer, which is one specific example of the management information; a reliability flag 150-S0 corresponding to the space bitmap information of the L0 layer; a reliability flag 150-S1 corresponding to the space bitmap information of the L1 layer; a reliability flag 150-D corresponding to the defect list information; and a reliability flag corresponding to the OPC pointer information 150-P, from the left to the right, in order. Incidentally, in the two-layer type optical disc, the sector number may be shared in the L0 layer and the L1 layer because of the parallel manner.

Specifically, for example, if the space bitmap information 120 in the L0 layer does not have consistency with the actual recording state of the L0 layer and is not correctly updated to the newest information, the flag of "1" is placed in the reliability flag 150-S0, which will be described later. On the other hand, if the space bitmap information 120 in the L0 layer has consistency with the actual recording state of the L0 layer and is correctly updated to the newest information, the flag of "0" is placed. More specifically, in the previous recording process, with respect to the space bitmap information 120 of the L0 layer, the flag of "1" is placed in the field of the space bitmap information 120 of the L0 layer in an "already recorded" block out of the ECC blocks specified by the sector numbers of the recording areas in the L0 layer, while the flag of "0" is placed in an "unrecorded" block, as described above. Then, in the current recording operation, firstly, the space bitmap information 120 of the L0 layer is taken into the information recording/reproducing apparatus. Then, if by the current recording operation, the record information is correctly recorded onto a block with sector numbers of the recording area of "100000h" to "10FFFFh", the flag of "1" is recorded as the "already recorded state" in the space bitmap information 120 of the L0 layer, nevertheless, if the power supply of the main body of the information recording/reproducing apparatus is cut off in such timing that the space bitmap information 120 of the L0 layer and the reliability flag 150-S0 are not updated, the space bitmap information 120 of the L0 layer is not correctly updated to the newest information on the optical disc 100. Namely, although the recording of the record information on the optical disc 100 is actually completed, the space bitmap information 120 of the L0 layer corresponding to the block in which the record information is recorded still has the flag of "0" for indicating the "unrecorded state" and is not updated to the newest information (a "X" mark in a field of a recorded flag 121 with the sector numbers of "100000h" to "10FFFFh" in FIG. 4). In this case, on the optical disc 100, the information of the flag of "1" or the like remains in place only in the field of the reliability flag 150-S0 corresponding to the space bitmap information 120 of the L0 layer, by a provisional updating process performed before the recording of the record information. Thus, it is possible to recognize the fact that the space bitmap information 120 is not correctly updated to the newest information.

In addition, the same manner applies even in the reliability flag 150-S1 corresponding to the space bitmap information of the L1 layer, the reliability flag 150-D corresponding to the defect list information, and the reliability flag 150-P corresponding to the OPC pointer information, and if the various management information does not have consistency with the actual recording condition and is not correctly updated to the newest information, the flag of "1" is placed. On the other hand, if the various management information has consistency with the actual recording condition and is correctly updated to the newest information, the flag of "0" is placed.

Specifically, as described above, even if the space bitmap information of the L0 layer is not correctly updated to the newest information because of the cut-off of the power supply or the like, for example, it is possible to specify the space bitmap information of the L0 layer which is considered to have low reliability in accordance with the reliability flag 150-S0 later. Thus, it is possible to find or limit a user data area 109-0 of the L0 layer, for example, which is managed by the space bit map information of the L0 layer specified to have low reliability. Therefore, it is enough if the space bitmap information of the L0 layer, which manages the found or limited user data area 109-0 of the L0 layer, is correctly updated to the newest information. Namely, it is unnecessary to perform verification or scanning, i.e. reading, with respect to the entire recording area of the information recording medium, and it is enough if the verification or scanning is performed with respect to only the found or limited user data area 109-0 of the L0 layer which is managed by the space bitmap information of the L0 layer considered to have low reliability. Therefore, it is possible to greatly reduce a time length required for correctly updating all the management information to the newest information. More specifically, a total of four reliability flags corresponding to the above-described four types of management information are provided one by one; namely, the reliability flag group are provided, with only four bits of data amount. As described above, the two-layer type optical disc in the example needs the reliability flag group having the data amount in proportion to the number of the management information, as compared to the comparison example which will be described later; however, it is possible to reduce a time length for correctly updating the management information to the newest information to "¼" times as long time length, for example. Incidentally, it is possible to record the four bits of data amount into one sector (2 KB) more than enough. In addition, it is obvious that as the capacity becomes larger as in the recording medium of BD-RE or the like, the effectiveness of the time length reduction becomes larger.

Particularly in the example, as described above, it is extremely effective if the various management information is classified and defined depending on how to use the recording area. For example, it is extremely effective if the various management information is classified correspondingly to the spare area SA1 or SA2, the user data area 109, and the OPC area PCA0. This is because a period and timing in which these recording areas are used or the data is recorded into the recording areas are similar. Thus, if the reliability flag 150-S0 or the like is set with respect to the management information which manages each of the recording areas, the data is highly possibly recorded in a short time into a block which is located spatially close, by spatial locality and timing locality, even if the power supply is cut off or a similar situation occurs. Thus, it is possible to minimize the range of the recording area which is specified such that the reliability of the various management information is low, and it is possible to realize more reduction and efficiency of a scanning time length and a time length for updating the space bitmap information 120 to the newest information.

Figure 5:
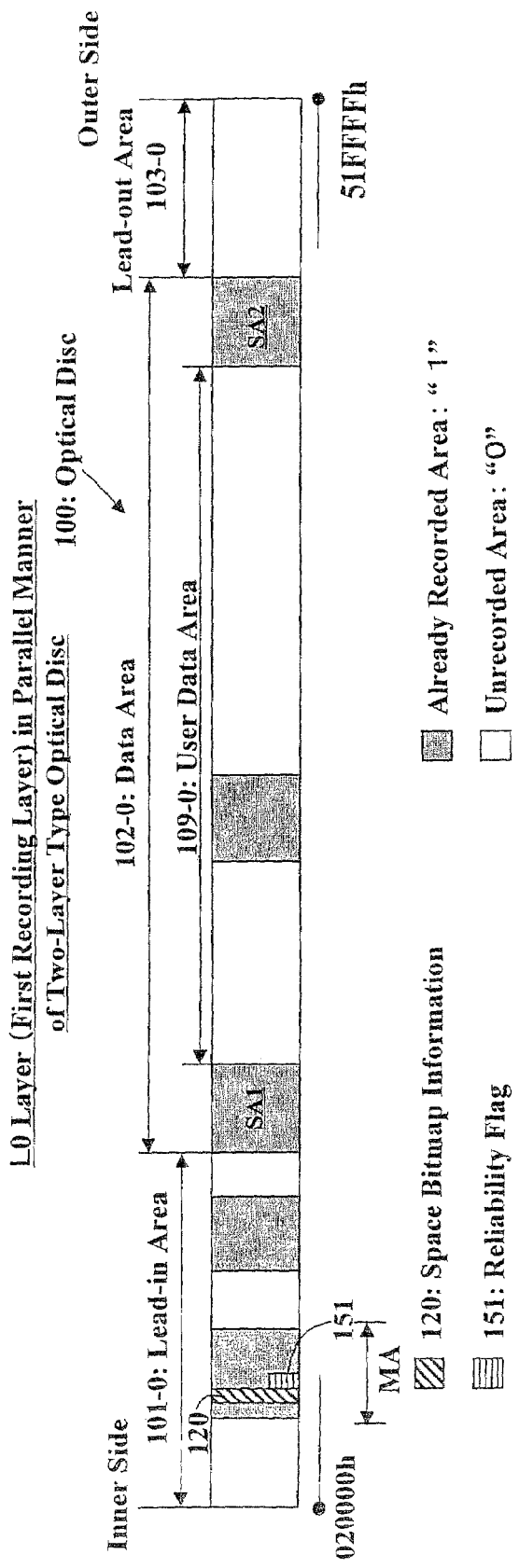
FIG. 5 is a schematic data structure diagram showing one specific example of the structure of the recording area of an optical disc in a comparison example, the recording area in which data is already recorded on the optical disc, and the sector number.

Next, with reference to FIG. 5 and FIG. 6, the operational effect of the example will be studied. FIG. 5 is a schematic data structure diagram showing one specific example of the structure of the recording area of an optical disc in a comparison example, the recording area in which data is already recorded on the optical disc, and the sector number. FIG. 6 is a conceptual table showing the physical sector number in the recording area, the space bitmap information, and the reliability flag group, in the optical disc in the comparison example. Incidentally, the structure of the recording area of the optical disc shown in FIG. 5 is substantially the same as that in FIG. 3 described above.

In the management area MA shown in FIG. 5, the space bitmap information 120, which constitutes one example of the "management information" of the present invention, is recorded, as described above. Moreover, in the management area MA, a reliability flag 151, which constitutes one example of the "reliability information" for indicating the reliability of the management information in the comparison example, is recorded.

In the comparison example, the reliability information does not correspond to each of the plurality of management information and indicates only one reliability of the entire management information. Thus, if it is judged by the reliability information that there is little reliability, it is hardly possible to specify which type of management information out of the plurality of management information does not have reliability. Thus, it is necessary to verify or scan all the management information to show whether or not it is correctly updated to the newest information. Therefore, even the management information that is reliable needs to be verified or scanned. Specifically, there arises a need for verification or scanning of the entire recording area, which takes a long time.

More specifically, one reliability flag 151 is provided as the information which indicates whether or not the space bitmap information 120 about the entire recording area is correctly updated. Specifically, when the optical disc 100 is inserted into the information recording/reproducing apparatus, which will be described later, the information of the flag of "1" or the like is placed in the reliability flag 151, and if the space bitmap information 120 is correctly updated to the newest information, the flag is reset to the flag of "0" when the optical disc 100 is ejected. On the other hand, if the space bitmap information 120 about the entire recording area is not correctly updated to the newest information because of the cut-off of the power supply of the main body of the information recording/reproducing apparatus, which will be described later, although the data is normally recorded, the information of the flag of "1" or the like remains in place in the field of the reliability flag 151. As described above, even if it is judged by the reliability flag 151 that there is little reliability in the space bitmap information 120 corresponding to total blocks, there arises a need for verification or scanning of the entire recording area in order to normally update the space bitmap information 120, which takes a long time.

As opposed to this, according to the optical disc 100 in the example explained with reference to FIG. 1 to FIG. 4, even if the space bitmap information 120 of the L0 layer is not correctly updated to the newest information because of the cut-off of the power supply or the like, it is possible to specify the space bitmap information 120 of the L0 layer considered to have low reliability, in accordance with the reliability flag 150-S0 later. Thus, it is possible to find the recording area (e.g. the user data area 109-0) which is managed by the space bit map information 120 of the L0 layer specified to have low reliability. Therefore, it is enough if the space bitmap information 120 of the L0 layer, which manages the found or limited user data area 109-0, is correctly updated to the newest information. Namely, it is unnecessary to perform verification or scanning, i.e. reading, with respect to the entire recording area of the information recording medium, and it is enough if the verification or scanning is performed with respect to only the found or limited user data area 109-0 which is managed by the space bitmap information 120 of the L0 layer considered to have low reliability. Therefore, consequently, it is possible to greatly reduce a time length required for correctly updating all the management information to the newest information. Thus, it is much more efficient than the comparison example.

(Information Recording/Reproducing Apparatus)

Next, with reference to FIG. 7 to FIG. 10, the structure and operation of the example of the information recording apparatus of the present invention will be explained in detail. Particularly, in the example, the information recording apparatus of the present invention is applied to the information recording/reproducing apparatus for the optical disc.

Figure 7:
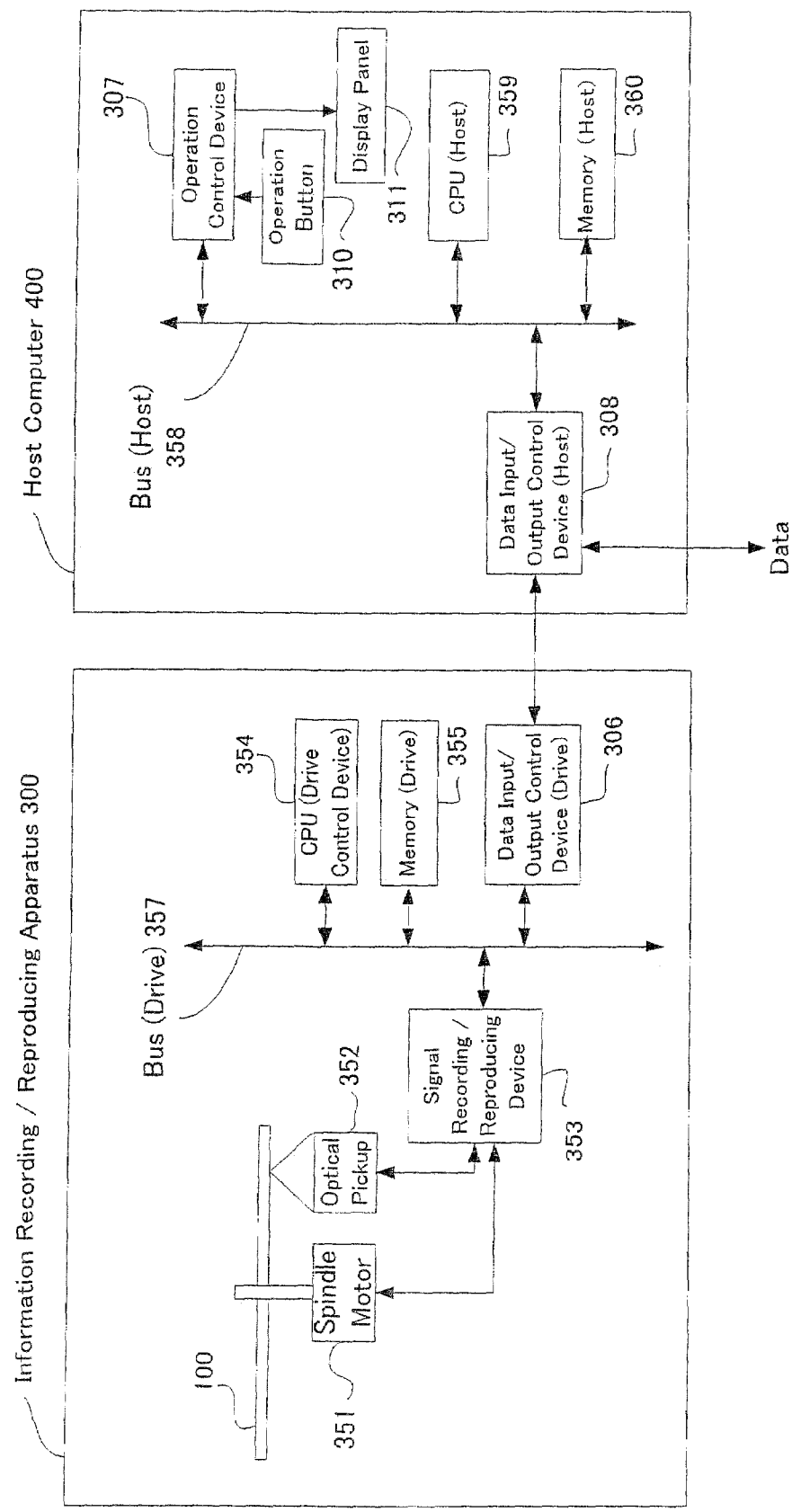
FIG. 7 is a block diagram of an information recording/reproducing apparatus in an embodiment of an information recording apparatus of the present invention, as well as a host computer.

Firstly, with reference to FIG. 7, the structures of an information recording/reproducing apparatus 300 and a host computer 400 in the example of the information recording apparatus of the present invention will be explained. FIG. 7 is a block diagram of the information recording/reproducing apparatus in the example of an information recording apparatus of the present invention, as well as the host computer. Incidentally, the information recording/reproducing apparatus 300 has a function of recording the record data onto the optical disc 100 and a function of reproducing the record data recorded on the optical disc 100.

The internal structure of the information recording/reproducing apparatus 300 will be explained with reference to FIG. 7. The information recording/reproducing apparatus 300 is an apparatus for recording the information onto the optical disc 100 and reading the information recorded on the optical disc 100, under the control of a Central Processing Unit (CPU) 354 for a drive.

The information recording/reproducing apparatus 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation control device 307; an operation button 310; a display panel 311; and a data input/output control device 308.

Particularly, a communication device may be constructed by including the information recording/reproducing apparatus 300 and the host computer 400 in the same case, or by using the CPU (drive control device) 354, the data input/output control device 306, and the bus 357.

The spindle motor 351 is intended to rotate and stop the optical disc 100, and operates in accessing the optical disc 100. More specifically, the spindle motor 351 is constructed to rotate and stop the optical disc 100 at a predetermined speed while receiving spindle servo by a not-illustrated servo unit or the like.

The optical pickup 352 performs the recording/reproducing with respect to the optical disc 100, and is provided with a semiconductor laser apparatus and a lens. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 performs the recording/reproducing with respect to the optical disc 100 by controlling the spindle motor 351 and the optical pickup 352. More specifically, the signal recording/reproducing device 353 is provided with a laser diode (LD) driver, a head amplifier, and the like. The LD driver drives the not-illustrated semiconductor laser apparatus built in the optical pickup 352. The head amplifier amplifies the output signal of the optical pickup 352, i.e., the reflected light of the light beam, and outputs the amplified signal. More specifically, the signal recording/reproducing device 353 drives the not-illustrated semiconductor laser apparatus built in the optical pickup 352, so as to determine the optimum laser power by the recording and reproduction process of an OPC pattern, along with a not-illustrated timing generator, under the control of the CPU 354, in the OPC process. Particularly, the signal recording/reproducing device 353 constitutes one example of the "recording device" and the "reading device" of the present invention, with the optical pickup 352.

The memory 355 is used in the all the data processing and the OPC process on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, i.e., firmware is stored; a buffer for temporarily storing the record/reproduction data; a Random Access Memory (RAM) area into which a parameter required for the operation of the firmware program or the like is stored; and the like.

The CPU (drive control device) 354 is connected to the signal recording/reproducing device 353 and the memory 355 via the bus 357, and controls the entire information recording/reproducing apparatus 300 by giving instructions to various devices. In general, software or firmware for operating the processor 354 is stored in the memory 355. Particularly, the CPU 354 constitutes one example of the "determining device", the "controlling device", and the "first and second updating devices", along with the optical pickup 352, the spindle motor 351, and the signal recording/reproducing device 353.

The data input/output control device 306 controls the data input/output from the outside with respect to the information recording/reproducing apparatus 300, and stores the data into or extracts it from the data buffer on the memory 355. A drive control command, which is issued from the external host computer 400 (hereinafter referred to as a host, as occasion demands) connected to the information recording/reproducing apparatus 300 via an interface, such as a SCSI (Small Computer System Interface) and an ATAPI (AT Attachment Packet Interface), is transmitted to the CPU 354 through the data input/output control device 306. Moreover, the record/reproduction data is also exchanged with the host computer 400 through the data input/output control device 306.

The operation control device 307 performs the reception of the operation instruction and display with respect to the host computer 400. The operation control device 307 sends the instruction of recording or reproducing by using the operation bottom 310, to the CPU 359. The CPU 359 sends a control command to the information recording/reproducing apparatus 300 through the input/output control device 308 on the basis of the instruction information from the operation control device 307, to thereby control the entire information recording/reproducing apparatus 300. In the same manner, the CPU 359 can send a command of requiring the information recording/reproducing apparatus 300 to send the operation condition to the host, to the information recording/reproducing apparatus 300. By this, it is possible to recognize the operation condition of the information recording/reproducing apparatus 300, such as during recording and during reproduction. Thus, the CPU 359 can output the operation condition of the information recording/reproducing apparatus 300, to the display panel 311, such as a fluorescent tube and a LCD.

One specific example in which the information recording/reproducing apparatus 300 and the host computer 400, as explained above, are used together is household equipment, such as recorder equipment for recording/reproducing a video. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the information recording/reproducing apparatus 300 is a disc drive (hereinafter referred to as a drive, as occasion demands), and the host computer 400 is a personal computer or a workstation. The host computer, such as the personal computer, and the drive are connected to each other through the data input/output control devices 306 and 308, such as the SCSI and the ATAPI. An application, such as writing software, which is installed in the host computer, controls the disc drive.

(Information Recording/Reproducing Method)

Figure 8:
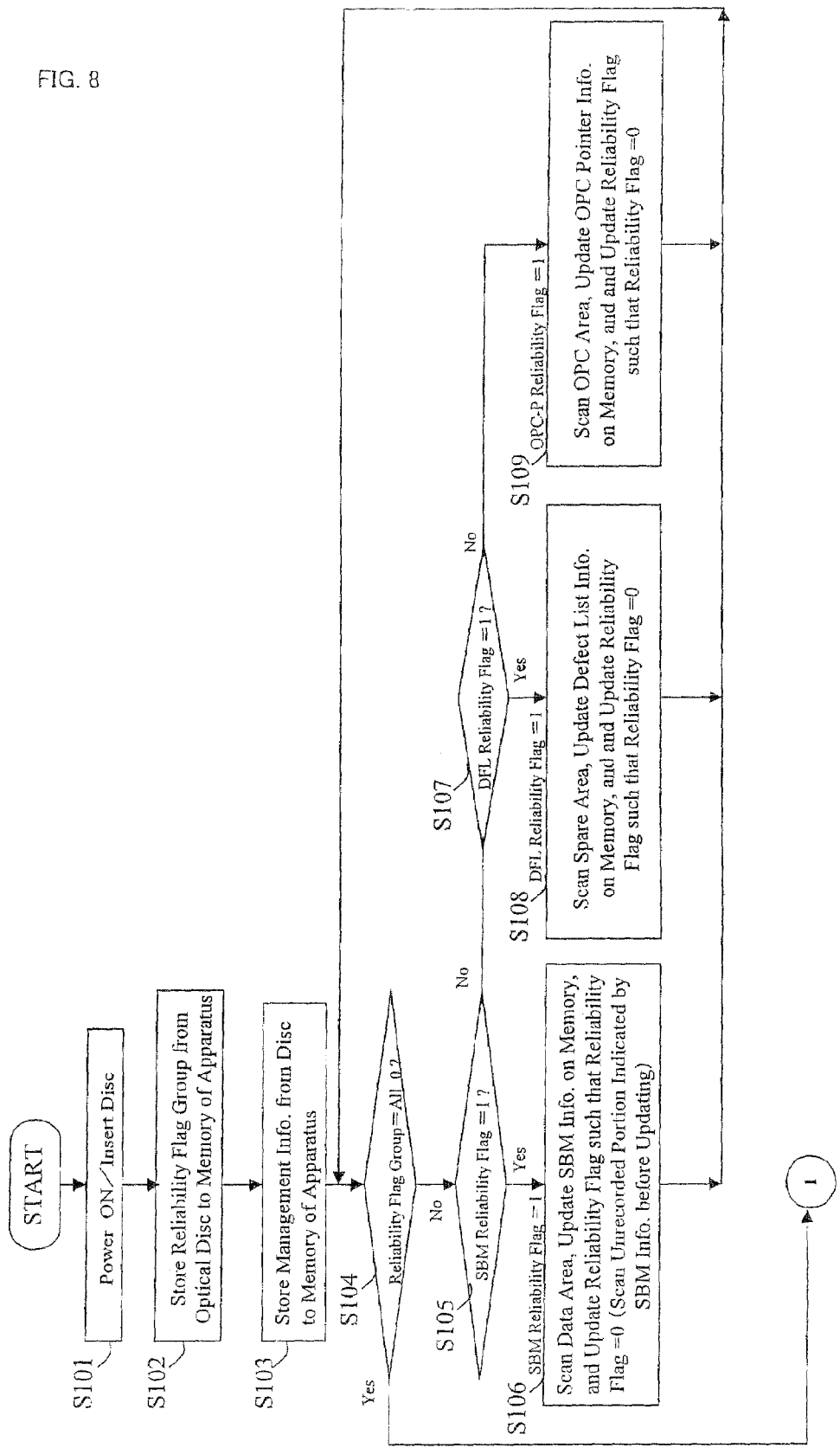
FIG. 8 is a flowchart showing an operation in which various management information is updated on a memory on the basis of the reliability flag group, which constitutes one example of the "reliability information", on the information recording/reproducing apparatus in the embodiment of the information recording apparatus of the present invention.
Figure 9:
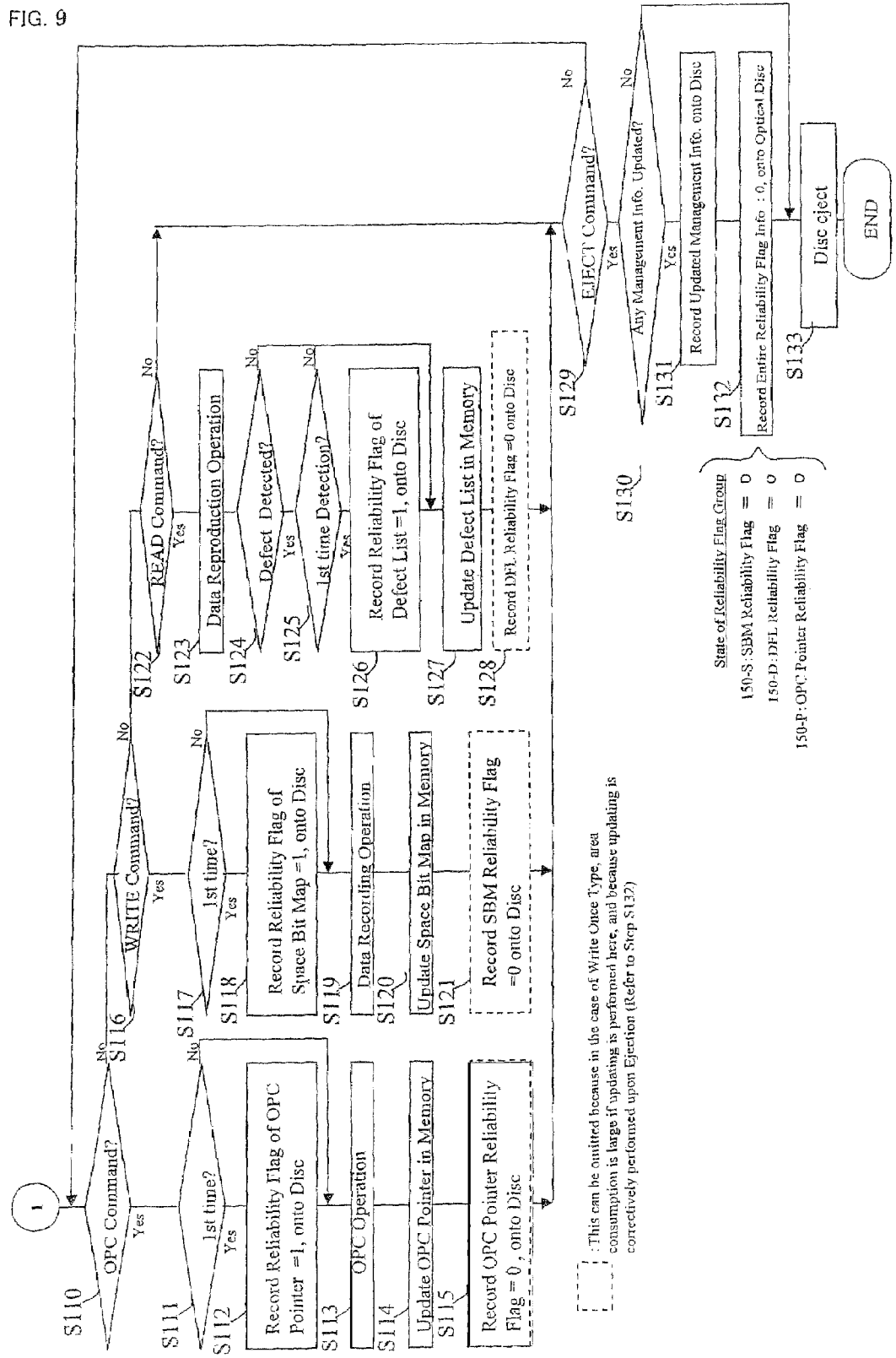
FIG. 9 is a flowchart showing a recording operation in a normal state on the information recording/reproducing apparatus in the embodiment of the information recording apparatus of the present invention.

Next, with reference to FIG. 8 to FIG. 10, both an operation in which various management information is updated to the newest information on the optical disc on the basis of the reliability flag group 150, on the information recording/reproducing apparatus 300 in the example of the information recording apparatus of the present invention whose structure is explained in FIG. 7, and a recording operation will be explained in detail. FIG. 8 is a flowchart showing the operation in which various management information is updated on the memory on the basis of the reliability flag group 150, which constitutes one example of the "reliability information", on the information recording/reproducing apparatus in the example of the information recording apparatus of the present invention. Incidentally, the operation in each process is basically instructed by that a command is issued from the operation button 310 in the host computer 400 to the information recording/reproducing apparatus 300. The recording of the data onto the optical disc 100 and the reproduction of the data from the optical disc 100 are performed by the information recording/reproducing apparatus 300.

Firstly, with reference to FIG. 8, the operation in which the various management information is updated on the memory (drive) 355, for example, on the basis of the reliability flag group 150, which constitutes one example of the "reliability information" on the information recording/reproducing apparatus 300, will be explained.

At first, the information recording/reproducing apparatus 300 in the example is powered on and started (step S101). Incidentally, it is assumed that the optical disc 100 is already placed or inserted in the information recording/reproducing apparatus 300.

Then, after confirming whether or not the disc is in an inserted condition with respect to the information recording/reproducing apparatus 300, the CPU 354 issues a command of reading the record information, for example. The optical pickup 352 reads the newest reliability flag group 150 from the management area MA on the optical disc 100. Under the control of the CPU 354, the reliability flag group 150 is stored into the RAM area of the memory 355 via the bus 357, for example (step S102).

The various management information is stored into the RAM area of the memory 355 of the information recording/reproducing apparatus 300, for example, as with the reliability flag group 150 in the step S102 (step S103).

Then, the information recording/reproducing apparatus 300 judges or determines whether or not the reliability flag group 150 stored in the non-volatile memory 355 is all "0" (step S104). If the reliability flag group 150 is not all "0" (the step S104: No), further, it is judged whether or not "1" is placed in the reliability flag 150-S corresponding to the space bit map information 120 (step S105). If the flag of "1" is placed in the reliability flag 150-S corresponding to the space bit map information 120 (the step S105: Yes), the reliability of the space bitmap information 120 is low, so that the space bitmap information 120 is correctly updated to the newest information on the memory 355. Specifically, in the L1 layer in addition to or in place of the L0 layer, for example, in which the flag of "1" is placed in the reliability flag 150-S0 or 150-S1, the verification or scanning, i.e., reading is performed, and the "already recorded" area and the "unrecorded" area are discriminated. The space bitmap information 120 recorded on the non-volatile memory 355 is correctly updated to the newest information, and at the same time, the reliability flag 150-S0 or 150-S1 is updated to "0" on the memory 355 (step S106). Incidentally, upon scanning the recording area, it is efficient if the unrecorded area shown in the space bitmap information 120 before the updating is preferentially scanned.

On the other hand, if the flag of "0" is placed in the reliability flag 150-S corresponding to the space bit map information 120 (the step S105: No) as a result of the judgment in the step S105, the space bitmap information 120 is correctly updated to the newest information, so that it is further judged whether or not "1" is placed in the reliability flag 150-D corresponding to the defect list information 130 (step S107). If the flag of "1" is placed in the reliability flag 150-D corresponding to the defect list information 130 (the step S107: Yes), the reliability of the defect list information 130 is low. Thus, the defect list information 130 is correctly updated to the newest information on the memory 355, and at the same time, the reliability flag 150-D is updated to "0" on the memory 355 (step S108).

On the other hand, if the flag of " " is placed in the reliability flag 150-D corresponding to the defect list information 130 (the step S107: No) as a result of the judgment in the step S107, the defect list information 130 is correctly updated to the newest information, so that "1" is placed in the reliability flag 150-P corresponding to the OPC pointer information 140. The reliability of the OPC pointer information 140 is low. Thus, the OPC pointer information 140 is correctly updated to the newest information on the memory 355, and at the same time, the reliability flag 150-P is updated to "0" on the memory 355 (step S109).

By repeating the step S104 to the step S109 described above, the reliability flag group 150 all becomes "0" in the end.

On the other hand, If the reliability flag group 150 is all "0" (the step S104: Yes), as a result of the judgment in the step S104, the various management information, such as the space bitmap information 120, the defect list information 130, and the OPC pointer information 140, all indicates the newest information, so that a series of updating process on the memory 355 is not performed.

Next, with reference to FIG. 9, a recording operation and an updating operation on the optical disc, in the normal state of the information recording/reproducing apparatus 300, will be explained. FIG. 9 is a flowchart showing a recording operation in the normal state on the information recording/reproducing apparatus in the example of the information recording apparatus of the present invention.

The information recording/reproducing apparatus 300 waits for an instruction for starting the OPC process, i.e. an OPC command, to be issued (step S110). If the OPC command is issued before the start of recording (the step S110: Yes), it is further judged whether or not it is the first OPC process after the insertion of the optical disc (step S111). If it is the first OPC process (the step S111: Yes), the flag of "1" is temporarily recorded or placed in the reliability flag 150-P corresponding to the OPC pointer information 140, in the management area MA on the optical disc 100 (step S112).

Then, the actual OPC process is performed, and the data for trial writing is recorded at a position specified by the OPC pointer information 140 on the OPC area PCA0 or PCA1 (step S113). The CPU 354 which has received the complete status of the OPC process, identifies the already used recording area, and updates the OPC pointer information 140 recorded on the memory 355 (step S114). After the updating of the OPC pointer information 140 is completed, "0" is definitely placed in the reliability flag 150-P, in the management area MA on the optical disc 100 (step S115). Incidentally, in the process of the step S115, the consumption of the recording area is large in the case of a write-once type optical disc, so that this process may be performed with other various management information in a step S132, which will be described later.

On the other hand, if it is not the first OPC process (the step S111: No) as a result of the judgment in the step S111, the above-described step S112 is omitted.

If the OPC command is not issued (the step S110: No), the information recording/reproducing apparatus 300 waits for an instruction for starting to record, i.e. a WRITE command (step S116). For example, if a record button is pressed on the operation button 310, the CPU 354 detects the pressing. If the data from the data input/output control device 306 is stored into the memory 355, the CPU 354 judges or determines that the instruction for starting to record, i.e. the WRITE command, has been issued (the step S116: Yes). Moreover, it is judged whether or not it is the first recording operation after the insertion of the optical disc (step S117). If it is the first recording operation (the step S117: Yes), the flag of "1" is temporarily placed in the reliability flag 150-S corresponding to the space bitmap information 120, in the management area MA on the optical disc 100 (step S118).

Then, the actual recording operation is performed, and the record information is recorded into the unrecorded area registered in the space bitmap information 120 on the user data area 109-0 (step S119). The CPU 354 which has received the complete status of the recording operation, identifies the already recorded area, and updates the space bitmap information 120 recorded on the memory 355 (step S120). After the updating of the space bitmap information 120 is completed, "0" is definitely placed in the reliability flag 150-S, in the management area MA on the optical disc 100 (step. S121). Incidentally, as explained in the above-described step S115, the process of the step S121 may be performed with other various management information in the step S132, which will be described later.

On the other hand, if it is not the first recording operation the step S117: No) as a result of the judgment in the step S117, the above-described step S118 is omitted.

If the WRITE command is not issued (the step S116: No), the information recording/reproducing apparatus 300 waits for an instruction for starting to reproduce, i.e. a READ or reproduction command (step S122). For example, if a reproduction button is pressed on the operation button 310, the CPU 354 detects the pressing. If the instruction for starting to reproduce, i.e. the READ command or the reproduction command, is issued (the step S122: Yes), the actual reproduction operation is performed. The reproduction information, e.g. the reproduction information recorded in the evacuation destination address of a defect registered in the defect list information 130 on the user data area 109-0, is reproduced (step S123).

Then, it is judged whether or not a defect is detected during the reproduction operation (step S124). If a defect is detected (the step S124: Yes), it is further judged whether or not it is the first defect detection after the insertion of the disc (step S125). If it is the first defect detection (the step S125: Yes), the flag of "1" is temporarily placed in the reliability flag 150-D corresponding to the defect list information 130, in the management area MA on the optical disc 100 (step S126).

Then, the CPU 354 which has detected the defect, identifies the area in which the defect is detected, and updates the defect list information 130 recorded on the memory 355 (step S127). After the updating of the defect list information 130 is completed, "0" is definitely placed in the reliability flag 150-D, in the management area. MA on the optical disc 100 (step S128). Incidentally, as explained in the above-described step S115, the process of the step S128 may be performed with other various management information in the step S132, which will be described later.

On the other hand, if the defect is not detected or it is not the first defect detection (the step 124 and the step S125: No) as results of the step S124 and the step S125, the above-described step S126 is omitted.

Then, the information recording/reproducing apparatus 300 waits for an instruction for ejecting the optical disc 100 from the operation button 310, i.e. an EJECT command, to be issued (step S129). If the instruction for ejecting, or the EJECT command, is issued (the step S129: Yes), it is further judged whether or not the updating of the various management information recorded on the memory 355 is performed (step S130). If the updating of the various management information recorded on the memory 355 is performed (the step S130: Yes), the various management information which is correctly updated to the newest information on the memory 355, is rewritten or written once into the management area MA of the optical disc 100 (step S131).

Then, "0" is definitely rewritten or written once in the entire reliability flag group 150 corresponding to the various management information (e.g. the reliability flag 150-S corresponding to the space bitmap information, the reliability flag 150-D corresponding to the defect list information, or the reliability flag 150-P corresponding to the pointer information) in the management area MA of the optical disc 100 (step S132).

Then, the information recording/reproducing apparatus 300 receives the issued instruction for ejecting the optical disc 100 from the operation button 310, or the issued command, in the step S129, and actually ejects the optical disc 100 (step S133).

On the other hand, if the instruction for ejecting or the EJECT command is not issued as a result of the judgment in the step S129 (the step S129: No), the information recording/reproducing apparatus 300 waits for the instruction for starting the OPC process, i.e. the OPC command, to be issued (the step S110).

Next, with reference to FIG. 10, a recording operation and an updating operation on the optical disc 100 if a power supply is cut off on the information recording/reproducing apparatus 300 during an application operation will be explained. FIG. 10 is a flowchart showing the recording operation if the power supply is cut off on the information recording/reproducing apparatus in the example of the information recording apparatus of the present invention. Incidentally, the recording operation from the step S110 to the step S133 is the same as that in the normal state in FIG. 9 described above.

As shown in FIG. 10, in the middle of the above-described various series of operations and the updating process of the various management information (refer to the step S113, S114, S119, S120, S126 or S127, for example), it is judged whether or not the power supply is cut off by a user, or whether or not the optical disc 100 is mechanically ejected (step S201). Here, if the cut-off of the power supply or the like is performed during the various series of operations (the step S201: Yes), the information recording/reproducing apparatus 300 is restarted, and the operational flow returns to the start of FIG. 8 described above.

On the other hand, if the cut-off of the power supply or the like is not performed during the various series of operations (the step S201: No), the operational flow goes forward to the step S129 described above.

Incidentally, the various control or the like may be performed by either the CPU 354 in the information recording/reproducing apparatus 300 or the CPU 359 in the host computer 400, or performed by the both working together cooperatively. Moreover, the same is true for the recording operation, and either the memory 355 in the information recording/reproducing apparatus 300 or the memory 360 in the host computer 400, may be used individually, or the both may be used at the same time, or nearly at the same time.

The example shows that the various management information and the reliability information are recorded in the management area MA, for example, and managed by the information recording/reproducing apparatus 300 or the host computer 400, under the control of the CPU 354 or 359. However, the various management information may be recorded in the user data area 109-0 or the like, for example, and managed by a file system, an application, or the like.

Incidentally, in the example, the write-once type optical disc 100 is explained as one example of the information recording medium, and a recorder or a player associated with the write-once type optical disc 100 is explained as one example of the information recording/reproducing apparatus. However, the present invention is not found or limited to the write-once type optical disc and the recorder or the player for it. By using the example, the present invention can be applied to: a rewritable information recording medium, such as a rewritable optical disc; a large capacity recording apparatus, such as a Blu-ray optical disc and a hard disk; other various information recording media for high density recording or high transfer rate; and a recorder or a player for the media.

The present invention is not limited to the above-described examples, and various changes may be made, if desired, without departing from the essence or spirit of the invention which can be read from the claims and the entire specification. An information recording medium, an information recording apparatus, and an information recording method, which involve such changes, are also intended to be within the technical scope of the present invention.

INDUSTRIAL APPLICABILITY

The information recording medium, the information recording apparatus, and the information recording method according to the present invention can be applied to a multi-layer type optical disc for consumer use or for business use, on which various information can be recorded at high density, and also applied to a recorder, a player, or the like, associated with the optical disc, for example. Moreover, they can be applied to an information recording medium, an information recording apparatus or the like, which are mounted on or can be connected to various computer equipment for consumer or for business use, for example.

The invention claimed is:

1. An information recording medium comprising a plurality of recording layers, said information recording medium comprising:

a record information recording area for recording therein record information;

a management information recording area for recording therein a plurality of types of management information for managing said record information recording area; and a reliability information recording area for recording therein a plurality of reliability information, each of which indicates reliability of whether or not respective one of the plurality of types of management information is correctly updated, wherein the plurality of types of management information includes at least one information out of space bitmap information for identifying an already recorded state or an unrecorded state with respect to each block of said record information recording area and defect list information for performing defect management, and the space bitmap information is the management information for each of the plurality of recording layers and the defect list information is the management information for entire of the plurality of recording layers, the plurality of reliability information indicate (i) reliability, for each of the plurality of recording layers, which indicates whether or not the space bitmap information is correctly updated and (ii) reliability, for entire of the plurality of recording layers, which indicates whether or not the defect list information is correctly updated.

2. The information recording medium according to claim 1, wherein the plurality of reliability information is collectively recorded in said reliability information recording area.

3. An information recording apparatus for recording record information onto an information recording medium comprising a plurality of recording layers, said information recording medium comprising:

a record information recording area for recording therein the record information;

a management information recording area for recording therein a plurality of types of management information for managing said record information recording area; and a reliability information recording area for recording therein a plurality of reliability information, each of which indicates reliability of whether or not respective one of the plurality of types of management information is correctly updated, wherein the plurality of types of management information includes at least one information out of space bitmap information for identifying an already recorded state or an unrecorded state with respect to each block of said record information recording area and defect list information for performing defect management, and the space bitmap information is the management information for each of the plurality of recording layers and the defect list information is the management information for entire of the plurality of recording layers, the plurality of reliability information indicate (i) reliability, for each of the plurality of recording layers, which indicates whether or not the space bitmap information is correctly updated and (ii) reliability, for entire of the plurality of recording layers, which indicates whether or not the defect list information is correctly updated, said information recording apparatus comprising:

a record information recording device for recording the record information;

a management information recording device for recording the management information; and a reliability information recording device for recording the reliability information corresponding to the management information, said reliability information recording device recording the reliability information so as to indicate that the reliability information is not reliable temporarily before starting the recording by said management information recording device.

4. An information recording method in an information recording apparatus for recording record information onto an information recording medium comprising a plurality of recording layers, said information recording medium comprising:

a record information recording area for recording therein the record information;

a management information recording area for recording therein a plurality of types of management information for managing said record information recording area; and a reliability information recording area for recording therein a plurality of reliability information, each of which indicates reliability whether or not respective one of the plurality of types of management information is correctly updated, wherein the plurality of types of management information includes at least one information out of space bitmap information for identifying an already recorded state or an unrecorded state with respect to each block of said record information recording area and defect list information for performing defect management, and the space bitmap information is the management information for each of the plurality of recording layers and the defect list information is the management information for entire of the plurality of recording layers, the plurality of reliability information indicate (i) reliability, for each of the plurality of recording layers, which indicates whether or not the space bitmap information is correctly updated and (ii) reliability, for entire of the plurality of recording layers, which indicates whether or not the defect list information is correctly updated, said information recording method comprising:

a record information recording process of recording the record information;

a management information recording process of recording the management information; and a reliability information recording process of recording the reliability information corresponding to the management information, said reliability information recording process recording the reliability information so as to indicate that the reliability information is not reliable temporarily before starting the recording by said management information recording process.

* * * * *